(12) United States Patent
Liu

(10) Patent No.: US 7,337,106 B2
(45) Date of Patent: *Feb. 26, 2008

(54) TEXT SENTENCE COMPARING APPARATUS

(75) Inventor: Shaoming Liu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 911 days.

This patent is subject to a terminal disclaimer.

(21) Appl. No.: 10/658,812

(22) Filed: Sep. 10, 2003

(65) Prior Publication Data

US 2004/0054521 A1    Mar. 18, 2004

(30) Foreign Application Priority Data

Sep. 13, 2002    (JP)    ............... 2002-269193

(51) Int. Cl.
  G06F 17/27    (2006.01)
  G06F 17/28    (2006.01)
(52) U.S. Cl. .............................. 704/9; 704/4
(58) Field of Classification Search .......... 704/9, 704/4
See application file for complete search history.

(56) References Cited

U.S. PATENT DOCUMENTS

| | | | | |
|---|---|---|---|---|
| 6,112,168 | A * | 8/2000 | Corston et al. | 704/9 |
| 6,374,209 | B1 * | 4/2002 | Yoshimi et al. | 704/9 |
| 6,871,174 | B1 * | 3/2005 | Dolan et al. | 704/9 |
| 7,016,829 | B2 * | 3/2006 | Brill et al. | 704/9 |

OTHER PUBLICATIONS

Shaoming Liu and Eiichi Tanaka, Algorithms for computing the Distances between Unordered Trees, 1996, Electronics and Communications in Japan, Part 3, vol. 79, No. 10, pp. 88-102.*
Harada et al., "Japanese Semantic Analysis System SAGE using EDR", Japanese Society for Artificial Intelligence, 2001, 16(1), pp. 85-93 (w/English-language Abstract).
Aizawa, "A Quantitative Representation of Features based on Words and Documents Co-occurances", Natural Language Processing, Mar. 2000, 136-4, pp. 25-32 (w/English-language Abstract).
Ma et al., "Self-Organizing Semantic Map of Japanese Nouns", Information Processing Society of Japan, vol. 42, No. 10, Oct. 2001, pp. 2379-2391 (w/English-language Abstract).

* cited by examiner

Primary Examiner—Richemond Dorvil
Assistant Examiner—Danelle E Jones
(74) Attorney, Agent, or Firm—Oliff & Berridge, PLC

(57) ABSTRACT

A text sentence comparison method includes converting a first text sentence and a second text sentence into a first R tree (or a first RO tree) and a second R tree (or a second RO tree), respectively, calculating a distance between the first R tree and the second R tree (or a distance between the first RO tree and the second RO tree) on the basis of a distance between two R trees (or a distance between two RO trees), which is defined at least in accordance with a condition of a mapping between vertexes and edges of the two R trees (or the two RO trees), and calculating a distance between the first text sentence and the second text sentence on the basis of the calculated distance between the first R tree and the second R tree (or the calculated distance between the first RO tree and the second RO tree).

28 Claims, 9 Drawing Sheets

FIG. 2
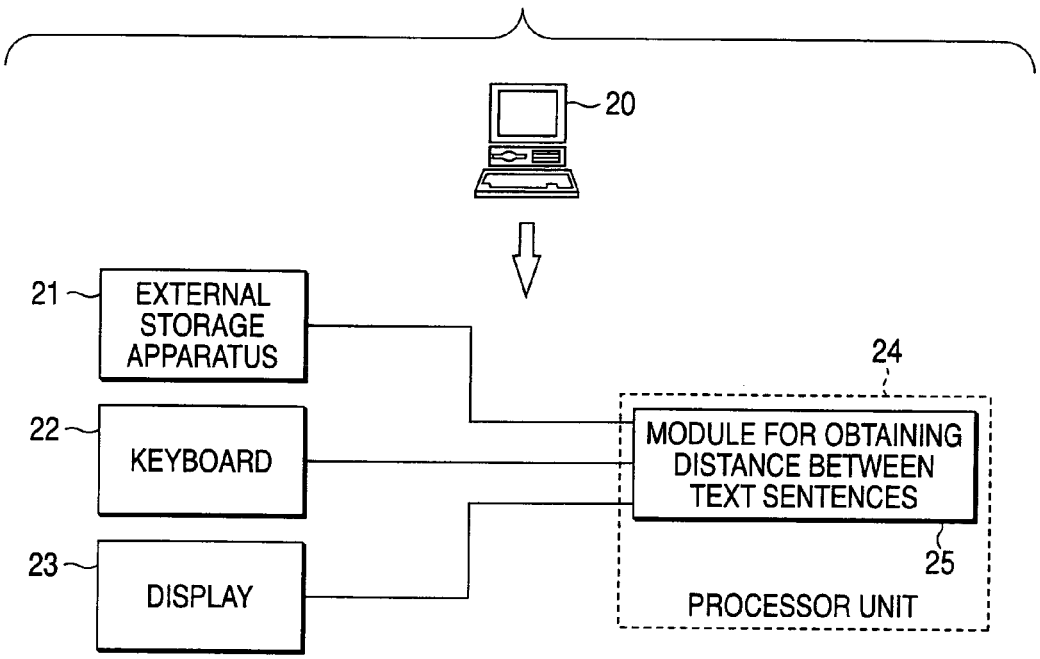
FIG. 3
A/DT TEACHER/NN TEACHES/VBZ ENGLISH/NNP TO/TO STUDENTS/NNS
WHERE, DT INDICATES DETERMINER, NN INDICATES NOUN
(SINGULAR OR MASS), VBZ INDICATES VERB (3RD PS. SING. PRESENT),
NNP INDICATES PROPER NOUN (SINGULAR), TO INDICATES TO,
AND NNS INDICATES NOUN (PLURAL)
FIG. 4
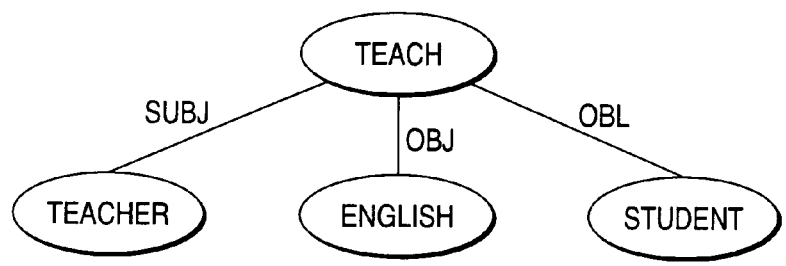

FIG. 5

| CASE CATEGORY 1 | CASE CATEGORY 1 | DISTANCE VALUE 11 |
|---|---|---|
| CASE CATEGORY 1 | CASE CATEGORY 2 | DISTANCE VALUE 12 |
| ... | ... | |
| CASE CATEGORY 1 | CASE CATEGORY m | DISTANCE VALUE 1m |
| ... | ... | |
| CASE CATEGORY m | CASE CATEGORY 1 | DISTANCE VALUE m1 |
| CASE CATEGORY m | CASE CATEGORY 2 | DISTANCE VALUE m2 |
| ... | ... | |
| CASE CATEGORY m | CASE CATEGORY m | DISTANCE VALUE mm |

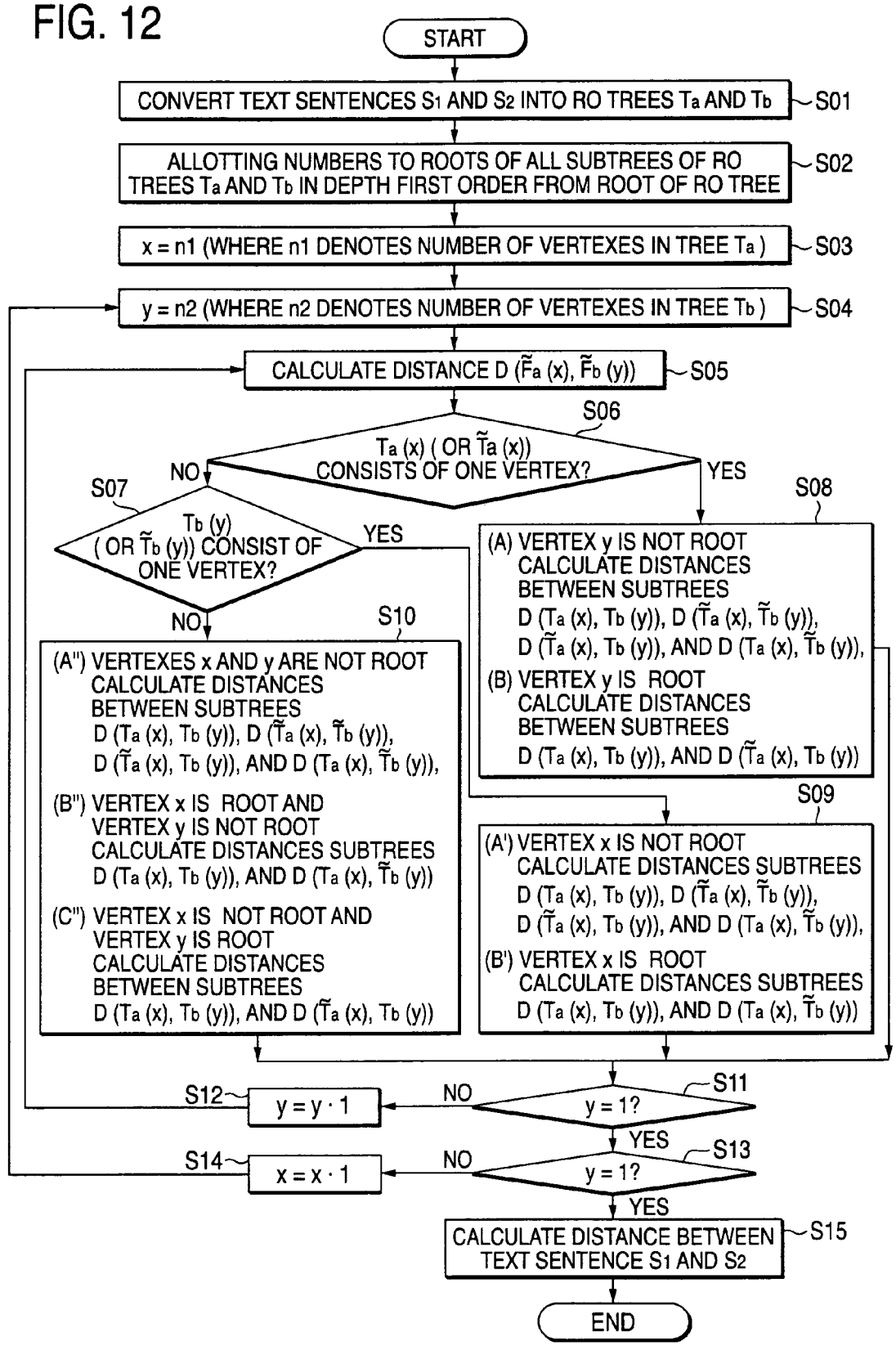

TEXT SENTENCE COMPARING APPARATUS

The present disclosure relates to the subject matter contained in Japanese Patent Application No. w2002-269193 filed on Sep. 13, 2002, Japanese Patent Application No. 2002-071273 filed on Mar. 15, 2003, and Japanese Patent Application No. 2003-071274 filed on Mar. 15, 2003, which are incorporated herein by reference in its entirety.

BACKGROUND OF THE INVENTION

1. Field of the Invention

The present invention is relates to an apparatus/method for comparing text sentences with each other to check differences in semantic contents by using, for example, a computer. More specifically, the present invention relates to an apparatus/method for comparing text sentences in high precision and in real time.

2. Description of the Related Art

Since IT technology has made rapid progress, especially, high-speed Internet mobile technology has made rapid progress, very large amounts of information may be utilized by anybody, anywhere, and anytime. Conversely, a so-called "information-flood phenomenon" may occur, so that users can hardly acquire such information which is truly required for these users. To realize such a world that proper information can be continuously acquired even under any conditions of users, the information which owns true values for these users must be extracted/reconstructed from such an information flood.

In this case, techniques for comparing semantic contents of documents with each other, techniques for classifying text documents in accordance with the semantic contents, and techniques related to understandings of information searching intentions of users may constitute important aspects. Also, in order to realize the comparisons of the semantic contents of the documents, the classifications of the text documents, and the understandings of the information searching intentions of the users, similarity judgments as to meaning by utilizing natural language processing technologies are necessarily required.

In this field, several sorts of technical ideas for judging similarity between text sentences have been proposed. However, the major technical ideas among them utilize local information of sentences, for example, word information appeared in sentences and dependency relation information between words, and therefore, can be hardly applied as evaluation bases of semantic contents of text sentences, namely cannot realize such a goal that the semantic contents of the documents are compared with each other, and the information searching intentions of the users are understood.

Very recently, such a method has been proposed. That is, text sentences are semantically analyzed, the analyzed text sentences are represented in the form of graphs, and then, experimental similarity are measured based upon the graphic representations. However, the proposed similarity has been measured not by considering structural changes, and also there is no clear definition in a relationship between the definitions of the similarity and the differences in the semantic contents of the text sentences.

As examples of the conventional techniques related to the present invention, the below-mentioned prior art has been proposed.

[Non-Patent Publication 1]

"Japanese Semantic Analysis System SAGE using EDR" written by Harada and Mizuno, "Japanese Society for Artificial Intelligence" in 2001, 16(1), pages 85 to 93.

[Non-Patent Publication 2]

"A Quantitative Representation of Features based on Words and Documents Co-occurences" written by Shoko Aizawa, "Natural Language Processing" in March, 2000, 136-4.

[Non-Patent Publication 3]

"Self-Organizing Semantic Map of Japanese Nouns" written by Q. Ma, "Information Processing Society of Japan", volume 42, No. 10, in 2001.

As previously described in the above prior art, the conventional systems contain such problems that the performance of comparing the similarity of the semantic contents between the text sentences is still inadequate. Also, the conventionally proposed similarity can be hardly linked to the explanations as to the differences in the semantic contents between the text sentences.

SUMMARY OF THE INVENTION

The present invention has been made to solve the above-explained problems. It is an object of the invention to provide an apparatus and a method, which can compare differences in semantic contents between text sentences in high precision and in real time. Furthermore, specifically, in the text sentence comparing apparatus/method according to the present invention, for instance, in order to realize comparisons between semantic contents of documents, classifications of text documents based on semantic contents, and understandings of information searching intentions by users, a distance, which can measure differences in semantic contents between text sentences is defined in a mathematical formalism. Also, this distance can be obtained in real time.

In order to achieve the above-described object, in a text sentence comparing apparatus according to the present invention, comparing operations between text sentences are carried out in accordance with the below-mentioned manner.

In other words, a tree representing section represents text sentences to be compared with each other as rooted trees on graph theory. A information applying section applies information produced based on the text sentences to respective vertexes of the trees represented by the tree representing section and also applies case information, which is dependency relation information between words, to respective edges. A tree distance defining section defines a distance between the trees, which is based on a correspondence relationship among the vertexes and among edges. A tree distance acquiring section acquires the distance between the trees defined by the tree distance defining section. A tree distance applying section applies the distance between the trees to a distance indicative of a difference (or similarity) between the text sentences. A text sentence distance acquiring section acquires a distance between the text sentences to be compared with each other based on the application by the tree distance applying section.

Therefore, as to two text sentences to be compared with each other, the entire constructions and the meaning of the text sentences are represented as rooted trees on the graph theory. Then, a semantic difference between these two text sentences can be considered based on a distance between these two text sentences, which is calculated by applying thereto a distance between the two trees, so that comparing operation between the text sentences can be carried out in high precision and in real time.

In this case, in accordance with the invention, since distances between trees on the graph theory are applied to comparing operations of text sentences, not only word information and case information contained in these text sentences, but also constructions of these text sentences are taken into consideration. The invention applies the word information to the vertexes of the tree and also applies the case information to the edges of the trees.

Also, distances between text sentences may be classified into two sorts of distances by judging as to either trees, which are rooted and ordered, or trees, which are rooted and not ordered, are employed. The two sorts of distances can be arbitrarily selected based on calculation speeds and comparison precision in application field.

It should be understood that such a tree, which is rooted and ordered on the graph theory, is referred to as an "RO tree (Rooted and Ordered Tree)", whereas such a tree, which is rooted and not ordered, is referred to as an "R tree (Rooted and Unordered Tree)" in this specification.

When an RO tree is compared with an R tree, generally speaking, the RO tree can be calculated in a simple manner as compared with the R tree, whereas meaning comparing precision of the R tree is higher than that of the RO tree.

Also, in accordance with the present invention, various sorts of information may be employed as the word information. For example, the word information may include word attribute information. This word attribute information, for example, may include part-of-speech information, which is acquired by way of a morphological analysis. Also, in the case of a verb, information as to a conjugation may be used.

Also, a sort of dependency relation between words corresponds to a case.

Also, the word information and the case information may be obtained by semantically analyzing, for example, a text sentence. Alternatively, the word information and the case information (in this case, dependency relation information) may be obtained by syntactically analyzing the text sentence and analyzing the text sentence in dependency relation.

Also, as a mapping condition between R trees, for example, a condition that "the mapping is a one-to-one mapping, parent-child relationship (hierarchical relationship) is preserved, structures of R trees are preserved, and the mapping between vertexes does not intersect with the mapping between edges" may be used for a mapping between vertexes and a mapping between edges.

Also, as a mapping condition between RO trees, for example, a condition that "the mapping is a one-to-one mapping, parent-child relationship (hierarchical relationship) is preserved, brother relationship is preserved, structures of RO trees are preserved, and the mapping between vertexes does not intersect with the mapping between edges" may be used for a mapping between vertexes and a mapping between edges.

Also, when a tree A is mapped to a tree B, for instance, a case in which a vertex of the tree A is mapped to a vertex of the tree B corresponds to a "substitution of vertex"; a vertex, which is located in the tree A and cannot be mapped, corresponds to a "deletion of vertex"; and a vertex, which is located in the tree B and cannot be mapped corresponds to an "insertion of vertex". Also, an edge of the tree A is mapped to an edge of the tree B corresponds to a "substitution of edge"; an edge, which is located in the tree A and cannot be mapped, corresponds to a "deletion of edge"; and an edge, which is located in the tree B and cannot be mapped corresponds to an "insertion of edge".

Also, as a distance between trees, for example, the minimum value of sum of weight (sum of mapping weight) in a case where one tree is mapped to another tree may be employed Further, this distance between trees implicitly includes a distance between forests.

Also, as a method of applying numbers to respective vertexes and respective edges of either an RO tree or an R tree, for example, the following method may be utilized. That is, while the numbers are allotted to the respective vertexes and respective edges in an increment manner by the way of a depth-priority searching operation, distances are calculated in an order from the vertexes having larger numbers. Specifically, distances are sequentially calculated from a subtree located on the lowest side to a subtree located on the upper side by employing a dynamic scheme method.

Also, a label is used in order to store information thereinto.

Furthermore, a structural example of the present invention will now be described as follows:

(1) A semantic content of text sentences comparing apparatus obtains a distance measuring semantic contents between text sentences. The comparing apparatus includes means for representing structures and meaning of the entire text sentences as RO trees or R trees, means for applying word information and dependency relation information between words (or case information) to vertexes and edges of the RO trees or the R trees, respectively, means for defining a distance between RO trees or R trees, which is based on correspondence relations between the vertexes and between edges, means for obtaining the defined distance between the RO trees or the R trees, means for applying the distance between the RO trees or R trees to a distance comparing semantic differences between the text sentences, and means for obtaining the distance between the text sentences.

(2) The means for defining the distance between RO trees or R trees, which is based on the correspondence relations between the vertexes and the edges, includes label allocation means for allocating labels to each vertex and each edge of the RO trees or R trees on the graph theory, number allocation means for allocating number to each vertex and each edge of the RO trees or R trees, mapping means for performing mapping between the RO trees or the R trees, on the basis of the correspondence relations between the vertexes and between the edges and mapping conditions between the RO trees or the R trees, which are based on the correspondence relations between vertexes and between the edges, mapping means for performing mapping between ordered or unordered forests based on the correspondence relations between the vertexes and between the edges, mapping weight setting means for defining weights of the mappings performed by these mapping means, means for defining a distance between the ordered or unordered forests based on the mapping means for performing the mapping between the ordered or unordered forests and the mapping weight setting means, and means for defining a distance between the RO trees or R trees based on the mapping means for performing the mapping between the RO trees or the R trees and the mapping weight setting means.

(3) The means for applying the distance between the RO trees or R trees to a distance comparing semantic differences between the text sentences includes means for making the mapping between the words correspond to the mapping between the vertexes of the RO trees or the R trees, means for making the word mapping weights correspond to the vertex mapping weight of the RO trees or the R trees, means for making the case mapping weights correspond to the edge mapping weights of the RO trees or the R trees, means for setting the word mapping weights, and means for setting the case mapping weight.

(4) The means for obtaining the distance between the text sentences sets the distance obtained by the means for obtaining the distances between either the RO trees or the R trees as the distance between the text sentences.

(5) The means for obtaining the distance between the text sentences sets a result obtained by dividing the distance obtained by the means for obtaining the distances between the RO trees or the R trees by a summation of total numbers of vertexes of the RO trees or the R trees.

(6) The means for setting the mapping weights between the words includes means for setting the substitution weights between the words stored in the each vertex when two vertexes are mapped in the mapping between the RO trees or the R trees, means for setting the deletion weights of the words stored in each vertex when the vertexes cannot be mapped and are deleted, means for setting the insertion weights of the words stored in each vertex when the vertexes cannot be mapped and are inserted, means for setting relation among the word substitution weights, the word deletion weights, and the word insertion weights.

(7) The means for setting the case mapping weights includes means for setting the case substitution weights between cases stored in each edges when two edges are mapped in the mapping between the RO trees or the R trees, means for setting the case deletion weight stored in the edges when the edge cannot be mapped and are deleted, means for setting the case insertion weight stored in the edges when the edge cannot be mapped and are inserted, means for setting relation among the case substitution weights, the case deletion weights, and the case insertion weights.

(8) The means for setting the word substitution weight includes means for setting the word substitution weight to 0 when two words are the same word, and means for setting positive constant value to the word substitution weight when the two words are different.

(9) The means for setting the word substitution weights sets the word substitution weights as a distance between two words.

(10) The means for setting the word deletion weight sets the word deletion weight as a constant.

(11) The means for setting the word deletion weight sets the word deletion weight based upon a part-of-speech of the word.

(12) The means for setting the word insertion weight sets the word insertion weight as a constant.

(13) The means for setting the word insertion weight sets the word insertion weight as a constant.

(14) The means for setting the relation among the word substitution weight, the word deletion weight, and the word insertion weight establishes a relationship satisfying "the word deletion weight+the word insertion weight>the word substitution weight".

(15) The means for setting the case substitution weight includes means for setting the case substitution weights to zero when two cases are identical to each other, and means for setting the case substitution weights to positive constants when two cases are different from each other.

(16) The means for setting the case substitution weight includes means for classifying all of cases into a plurality of N categories, means for setting the substitution weight between the categories of the cases, and means for setting the substitution weight between cases as the substitution weights between categories to which two cases belong, respectively.

(17) The means for setting the case deletion weight sets the case deletion weight as a constant.

(18) The means for setting the case deletion weight sets the case deletion weight based upon a sort of a case.

(19) The means for setting the case insertion weight sets the case insertion weight as a constant.

(20) The means for setting the case insertion weight sets the case insertion weight based upon a sort of a case.

(21) The means for setting the relation among the case substitution weight, the case deletion weight, and the case insertion weight establishes such a relation satisfying "the case deletion weight+the case insertion weight>the case substitution weight.

(22) A semantic content of text sentences comparing method obtains a distance measuring semantic contents between text sentences. The comparing method includes representing structures and meaning of the entire text sentences as RO trees or R trees, applying word information and dependency relation information between words (or case information) to each vertex and each edge of the RO trees or the R trees, obtaining the defined distance between the RO trees or the R trees based on correspondence relations between the vertexes and between the edges, applying the distance between the RO trees or the R trees to a distance comparing semantic differences between the text sentences, and obtaining the distance between the text sentences.

BRIEF DESCRIPTION OF THE DRAWINGS

FIG. 2 is a diagram for showing a structural example in the case that both an apparatus/method for comparing implicated-contents between text sentences, according to the present invention, are applied to an information terminal apparatus.

FIG. 3 is a diagram for indicating an example of an analysis result made by a morphological analysis section.

FIG. 4 is a diagram for representing an example of a representation of a tree structure.

FIG. 5 is a diagram for indicating an example of a data construction of a table (list) as to distances among case categories.

FIG. 12 shows calculation procedure of the distance between RO trees

DETAILED DESCRIPTION OF THE PREFERRED EMBODIMENT

Referring now to drawings, an embodiment of the invention will be described.

Figure 1:
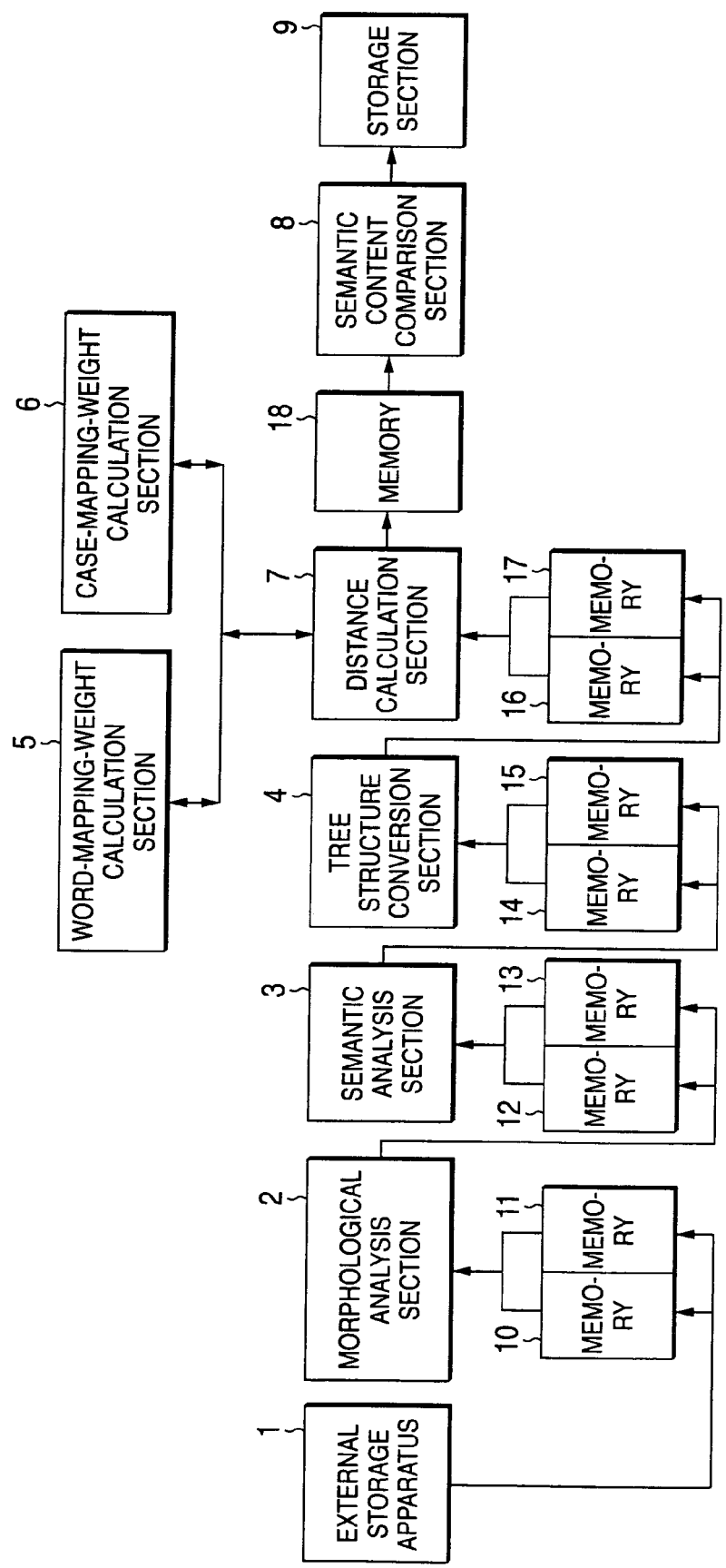
FIG. 1 is a diagram for indicating a structural example of an apparatus for comparing semantic content between text sentences according an embodiment of the present invention.

FIG. 1 shows an embodiment of an apparatus for comparing semantic contents of text sentences with each other (text sentence comparing apparatus) according to the embodiment of the invention. This text sentence comparing apparatus executes a method of comparing semantic contents of text sentences with each other according to the embodiment of the invention.

The text sentence comparing apparatus shown in this drawing includes an external storage apparatus 1, a morphological analysis section 2, a semantic analysis section 3, a tree structure conversion section 4, a word-mapping-weight calculation section 5, a case-mapping-weight calculation section 6, a distance calculation section 7, a semantic content comparison section 8, a storage section 9, and a plurality of memories 10 to 18. The morphological analysis section 2 extracts morphemes of a text sentence. The semantic analysis section 3 analyzes meaning of a text sentence. The tree structure conversion section 4 converts an analyzed result of the semantic analysis section 3 into either an RO tree or an R tree on the graph theory. The word-mapping-weight calculation section 5 calculates a word substitution weight when two words are substituted, a word deletion weight when a word is deleted, and a word insertion weight when a word is inserted. The case-mapping-weight calculation section 6 calculates a case substitution weight when two cases are substituted, a case deletion weight when a case is deleted, and a case insertion weight when a case is inserted. The distance calculation section 7 calculates a distance between either RO trees or R trees. The semantic content comparison section 8 acquires a difference in semantic content between text sentences. The storage section 9 is constituted by, for example, a memory.

Also, data of text sentences is stored in the external storage apparatus 1.

The memory 10 and the memory 11 store data of two text sentences read from the external storage apparatus 1, respectively. The memory 12 and the memory 13 store analysis results of the two text sentences made by the morphological analysis section 2 respectively. The memory 14 and the memory 15 store semantic analysis results of the two text sentences made by the semantic analysis section 3, respectively. The memory 16 and the memory 17 store conversion results made by the tree structure conversion section 4 as to the two text sentences. The memory 18 stores either a distance between the RO trees or a distance between the R trees, which is calculated by the distance calculation section 8.

Alternatively, it should be noted that these memories 10 to 18 may be combined with each other, or a text sentence comparing apparatus may be formed without using these memories 10 to 18.

The morphological analysis section 2 extracts both morphemes and attributes of the two text sentences stored in the memory 10 and the memory 11, and then stores the analysis results of the respective text sentences into the memory 12 and the memory 13, respectively.

The semantic analysis section 3 is input the morphological analysis results stored in the memory 12 and the memory 13 to, analyzes meanings of the text sentences, and then stores analysis results of the text sentences into the memory 14 and the memory 15, respectively.

The tree construction converting unit 4 converts the semantic analysis results stored in the memory 14 and the memory 15, into either RO trees or R trees, and then, stores word information (including attributes of words) appeared in the text sentences into vertexes of either the converted RO trees or the converted R tree, and also stores relevant case information appeared in the text sentence into edges of the RO trees or the R trees.

Also, the tree structure conversion section 4 stores the converted results as to the text sentences into the memory 16 and the memory 17, respectively.

The word-mapping-weight calculation section 5 calculates a word substitution weight, a word deletion weight, and a word insertion weight, which are required to calculate either a distance between RO trees or a distance between R trees, and then supplies them to the distance calculation section 7.

The case-mapping-weight calculation section 6 calculates a case substitution weight, a case deletion weight, and a case insertion weight, which are required to calculate either a distance between RO trees or a distance between R trees, and then supplies them to the distance calculation section 7.

The distance calculation section 7 calculates a distance between either the two RO trees or the two R trees stored in the memory 16 and the memory 17, and then, stores the calculated results thereof into the memory 18.

The semantic content comparison section 8 calculates a distance between the text sentences by using either the distance between the RO trees or the distance between R trees stored in the memory 18, and then stores the calculated result into the storage section 9.

Next, a construction example of an information terminal apparatus to which an apparatus and a method for calculating a distance used to compare semantic contents between text sentences, according to the invention, are applied, as an application example.

FIG. 2 shows a construction example of an apparatus to which the method for calculating the distance used to compare the semantic contents between the text sentences, according to the present invention, is applied, as the application example.

The information terminal apparatus 20 shown in FIG. 2 includes an external storage apparatus 21, a keyboard 22, a display 23, and a processor unit 24. This processor unit 24 is equipped with a module 25 for obtaining a distance between text sentences.

The external storage apparatus 21 stores thereinto data of input text sentences, either a word feature dictionary or a thesaurus dictionary, which are used so as to obtain a word mapping weight, a weight dictionary used to obtain a case mapping weight, a result of a calculated distance between text sentences, software, and the like. This external storage apparatus 21 functions as a storage space used in a calculation. In this case, as to the word feature dictionary, the thesaurus dictionary, the weight dictionary, and the like, for example, these dictionaries have been previously formed, or existing dictionaries may be prepared. Also, specifically, the external storage apparatus 21 may be constituted by, for instance, a hard disk drive.

The keyboard 22 is an input apparatus used to instruct an operation by a user. It should also be noted that another input apparatus may be added thereto.

The display 23 corresponds to an output apparatus for displaying thereon a message with respect to the user, data or a text sentence, an analysis result, a calculation result of a distance, and the like. It should also be noted that another output apparatus may be additionally provided.

The processor unit 24 executes an actual process operation in accordance with the software or the like stored in the external storage apparatus 21. Specifically, this processor unit 24 may include, for example, a computer system such as a microprocessor and a personal computer. Then, the morphological analysis section 2, the semantic analysis section 3, the tree structure conversion section 4, the word-mapping-weight calculation section 5, the case-mappingweight calculation section 6, the distance calculation section 7, and the semantic content comparison section 8 may be constructed by the software operated on this processor unit 24.

Next, operations of the apparatus for comparing differences in semantic contents between text sentences according to the embodiment of the present invention will now be explained in detail.

The external storage apparatus 1 has stored thereinto data of text sentences. The data of the two text sentences are read out from the external storage apparatus 1, and then, are stored into the memory 10 and the memory 11, respectively. The morphological analysis section 2 extracts the morphemes of the text sentences stored in the memory 10 and the memory 11, and then, stores the extracted results into the memory 12 and the memory 13, respectively.

In this case, as the morphological analysis tool, arbitrary morphological analysis tools which have been published may be utilized. For instance, the morphological analysis tool "ChaSen" may be used, which has been produced by Matsumoto Laboratory of Nara Institute of Science and Technology.

Also, FIG. 3 indicates an analysis result of a morphological analysis with respect to such a sentence "a teacher teaches English to students"

The syntactic-and-semantic analysis section 3 inputs thereinto the results of the morphological analysis stored in the memory 12 and the memory 13, analyzes sentence structures of the text sentences, dependency relation (or case information) of the text sentences, deep structures of the text sentences, and the like, and then, stores the analyzed results into the memory 14 and the memory 15, respectively.

Here, as a syntax analysis tool and a semantic analysis tool, arbitrary syntax analysis tools and arbitrary semantic analysis tools may be utilized, which have been known. For example, the method described in the non-patent publication 1 may be employed (see non-patent publication 1).

The tree structure conversion section 4 inputs thereinto the analysis result stored in the memory 14 and the memory 15, converts the inputted analysis results into tree structures, and then, stores the converted tree structures into the memory 16 and the memory 17, respectively.

FIG. 4 indicates a tree structure in which the analysis result of the semantic analysis of the text sentence "a teacher teaches English to students" is converted into a form of the tree structure. As word information and case information, "a teacher" and "SUBJ", "English" and "OBJ", "students" and "OBJ", and "teach" and "NULL" are stored in the vertexes, respectively.

In FIG. 4, as the case information, SUBJ (subjective case), OBJ (objective case), OBL (oblique case), and NULL (empty) are indicated. Alternatively, as the case information, an ADJUNCT (adjunct case) may be employed.

In this embodiment, in order to obtain differences between a tree $T_a$ and a tree $T_b$, consider a mapping set from the tree $T_a$ to the tree $T_b$, which satisfies a predetermined condition. Generally, in a mapping between two different trees, substitution, deletion, and/or insertion of vertexes and substitution, deletion, and/or insertion of edges occur. For example, in FIG. 10, a vertex "Hanako" and an edge "ADJUNCT" of a left tree is deleted. When weights are set with respect to the substitution, the deletion, and the insertion, differences between two trees can be evaluated using the weights. In this embodiment, this evaluation of the differences is referred to as "a distance between two trees". For example, a mapping $M_{Rmin}$, which has minimum sum of the weights, is obtained from among a mapping set $M_R$ satisfying a predetermined condition that "the mapping is a one-to-one mapping, parent-child relationship (hierarchical relationship) is preserved, a structure is preserved, and mapping between vertexes and mapping between edges don't intersect with each other", and then, the sum of the weights of the mapping $M_{Rmin}$ is defined as the distance between R trees. Also, a mapping $M_{ROmin}$, which has minimum sum of the weights, is obtained from among a mapping set $M_{RO}$ satisfying another predetermined condition that "the mapping is a one-to-one mapping, parent-child relationship (hierarchical relationship) is preserved, right/left relationship between brothers is preserved, a structure is preserved, and mapping between vertexes and mapping between edges don't intersect with each other", and then, the sum of the weights of the mapping $M_{ROmin}$ is defined as the distance between RO trees.

The word-mapping-weight calculation section 5 calculates a word substitution weight, a word deletion weight, and a word insertion weight in response to request from the distance calculation section 7, and then, provides these calculated weights to the distance calculation section 7.

The word substitution weight may be a constant or may be set by using a distance between words. In the former case, when two words are the same words, the word substitution weight is set as zero. Conversely, when two words are not identical to each other, the word substitution weight is set to a positive constant. In the latter case, the word-mapping-weight calculation section 5 obtains a distance between two words, and provides a value of the obtained distance to the distance calculation section 7 as the word substitution weight.

As a method of obtaining a distance between words, arbitrary known methods may be utilized. For instance, there are a statistical method, a method using a thesaurus dictionary, and a method using a neural network. As the statistical method, for instance, the distance between the words may be obtained by employing the tf·idf method described in the non-patent publication 2 (see non-patent publication 2). As the method using the thesaurus dictionary, for example, a length of a minimum path between concepts to which two words belong may be set as the distance between the words. As the method using the neural network, for instance, the method described in the non-patent publication 3 (see non-patent publication 3) may be employed. Also, other known methods may be used.

The word deletion weight may be a constant. Alternatively, the word deletion weight may be set in accordance with part-of-speech information of a word. In the latter case, a weight is allotted to a part-of-speech of a word, and the word deletion weight is a product of a part-of-speech weight by a constant. As a part-of-speech weight setting operation, for instance, it is preferable to apply a large weight to a part of speech having an important role. As one example, it may be possible to set that a weight of a verb is the largest weight, and weights of part-of-speech becomes smaller in order of an adjective verb, a noun, an adverb, and an adjective. Alternatively, part-of-speech weights may be set based upon other orders.

The word insertion weight may be a constant. Alternatively, the word insertion weight may be set based upon part-of-speech information of a word. In the latter case, a weight is allotted to a part-of-speech of a word. The word insertion weight is a product of a part-of-speech weight by a constant. As a part-of-speech weight setting method, a method similar to the part-of-speech weight setting method, which has been described with respect to the word deletion weight, may be used. Alternatively, the part-of-speech weight may be set based upon other different methods. PARA0The case-mapping-weight calculation section 6 calculates a case substitution weight, a case deletion weight and a case insertion weight in response to a request from the distance calculation section 7. Then, the case-mapping-weight calculation section 6 provides these calculated weights to the vertex-mapping-weight calculation section 7. PARA0The case substitution weight may be a constant. Alternatively, the case substitution weight may be set using a distance between cases. In the former case, when two cases are the same case, the case substitution weight is set to zero. Conversely, when two cases are not identical to each other, the case substitution weight is set to a positive constant. In the latter case, the case-mapping-weight calculation section 6 obtains a distance between two cases and provides a value of the obtained distance to the distance calculation section 7 as the case substitution weight. PARA0In this case, one example of a method for obtaining the distance between cases will be given. PARA0First, all of cases are classified into several categories depending upon contents thereof. It should be noted that number of elements in the categories is not less than 1. PARA0Also, a table of distances among the case categories as shown in FIG. 5 is prepared. In the table shown in FIG. 5, with respect to all of combinations of a plurality (namely, "m" pieces) of case categories, the distances (i.e., distance value 11 to distance value mm) among the case categories are set. PARA0Next, the case categories to which two cases belong, respectively, are obtained which are specified based upon two pieces of given case information. Also, a distance value between the two acquired case categories is obtained. Thus, this obtained distance value may be set as a distance between the two cases. PARA0It should also be noted that another method maybe employed as a method of obtaining the distance between cases. PARA0The case deletion weight may be a constant. Alternatively, the case deletion weight may be set in accordance with a sort of a case. In the latter case, a weight is allotted to a case and a case deletion weight is a product of the case weight by a constant. As setting of the case weights, for example, it may be possible to set that, for instance, a weight of SUBJ is the largest weight. The weights may become smaller in order of OBJ, OBL, and ADJUNCT. Alternatively, the case weights may be set based upon other orders. PARA0The case insertion weight may be a constant. Alternatively, the case insertion weight maybe set in accordance with a sort of a case. In the latter case, a weight is allotted to a case and the case insertion weight is set as a product of the case weight by a constant. As setting of the case weights, for example, it may be possible to use a setting method similar to the method of setting the case weight as described with respect to the case deletion weight. Also, the case insertion weight may be set based upon other different setting methods. PARA0The distance calculation section 7 calculates a distance between either RO trees or R trees stored in the memory 16 and the memory 17 and then, stores the calculation result into the memory 18. If the word substitution weight, the word deletion weight, the word insertion weight, the case substitution weight, the case deletion weight, and the case insertion weight is required to calculate the distance between trees, the distance calculation section 7 outputs the word information and the case information of the two text sentences to be compared together with a calculation request to the word-mapping-weight calculation section 5 and the case-mapping-weight calculation section 6. Upon receiving the calculation request, the word-mapping-calculation section 5 and the case-mapping-calculation section 6 conduct the calculation and output required information to the distance calculation section 7. PARA0Next, definition of a distance between RO trees based on correspondence relation between vertexes and edges and a distance between R trees based on correspondence relation between vertexes and edges and a method for obtaining each distance will be described. PARA0First, in order to describe definition of a distance between trees and the method for obtaining the distance between trees, relative symbols are defined as follows: PARA0Number of edges in a path from the root to vertex x is defined as the depth of x, denoted by dep(x). The depth of the root is 0. A vertex having the depth of dep(x)+1 is called a child of x, the set of children of vertexes x is denoted by Ch(x). A vertex, which does not have a child, is called a leaf. A vertex having the depth dep(x)−1 is called a parent of x, denoted by pa(x). When expressing as pa2(x)=pa (pa (x)), a component of $An(x) = \cup_{i=1,\ldots,dep(x)} \{pa^i(x)\}$ is called ancestor of x. An edge between a vertex x and its parent is denoted by x̃. When x is the root, x̃ is empty. Here, assuming that a vertex x is not a parent of the vertex x. A set of ancestor An(x̃) of the edge x̃ can be defined similarly. A set of edges from an edge x̃ to an ancestor ũ of the edge x̃ is denoted by path(x̃, ũ). Labels are allotted to vertexes and edges of a tree, respectively. Labels of a vertex x and an edge x̃ are denoted by lab(x) and lab(x̃), respectively. In the invention, a label of a vertex indicates word information and a label of an edge indicates case information. When arbitrary two vertexes $x_1$ and $x_2$ ($x_1 \neq x_2$) satisfy $x_1 \notin An(x_2)$ and $X_2 \notin An(x_1)$, we say $x_1$ and $x_2$ are separated, and denoted by sep($x_1$, $x_2$). Similarly, when arbitrary two edges $\tilde{x}_1$ and $\tilde{x}_2$ ($\tilde{x}_1 \neq \tilde{x}_2$) satisfy $\tilde{x}_1 \notin An(\tilde{x}_2)$ and $\tilde{x}_2 \notin An(\tilde{x}_1)$, we also say $\tilde{x}_1$ and and denoted by sep($\tilde{x}_1$, $\tilde{x}_2$) PARA0A subtree, which is of a tree $T_a$ and has a vertex x as the root, is denoted by $T_a(x)$. PARA0A set of vertexes of the subtree $T_a(x)$ is denoted by $V_a(x)$.

A set of edges of the subtree $T_a(x)$ is denoted by $E_a(x)$.

A part, which consists of the subtree $T_a(x)$ and an edge x̃, is denoted by $\tilde{T}_a(x)$ and $\tilde{T}_a(x)$ is also called a subtree.

A set of vertexes of the subtree $\tilde{T}_a(x)$ is denoted by $\tilde{V}_a(x)$, and a set of edges of the subtree $\tilde{T}_a(x)$ is denoted by $\tilde{E}_a(x)$. In this case, $V_a(x) = \tilde{V}_a(x)$ and $E_a(x) \cup \{\tilde{x}\} = \tilde{V}_a(x)$ are established.

A part, which consists of subtrees $\tilde{T}_a(x_1)$, $\tilde{T}_a(x_2)$, ..., $\tilde{T}_a(x_m)$ is called a forest, and the forest is denoted by $\tilde{F}_a(x)$.

In a mapping from a tree $T_a$ to a tree $T_b$, a vertex x or an edge x̃ of the tree $T_a$ may be moved in the tree $T_b$ with no changes. The above translations will be defined. A translation in which a vertex x of $T_a$ is changed into a vertex y of $T_b$ is denoted by (x, y) and is called that the vertex x maps to the vertex y. At this time, a label of the vertex may be changed. A translation in which an edge x̃ of $T_a$ is changed to an edge ỹ of $T_b$ is denoted by (x̃, ỹ) and is called that the edge x̃ maps to the edge ỹ. At this time, a label of the edge may be changed. The above-described mapping M is a set of (x, y) and (x̃, ỹ).

With respect to subtrees $T_a(x)$, $T_b(y)$, $\tilde{T}_a(x)$, and $\tilde{T}_a(y)$, $J_V(x)$, $I_V(y)$, $J_E(\tilde{x})$, and $I_E(\tilde{y})$ are defined as follows.

$$J_V(x) = \{j | (i, j) \in M, i \in V_a(x)\}$$

$$I_V(y) = \{i | (i, j) \in M, j \in V_b(y)\}$$

$$J_E(\tilde{x}) = \{\tilde{j} | (\tilde{i}, \tilde{j}) \in M, \tilde{i} \in \tilde{E}_a(x)\}$$

$$J_E(\tilde{y}) = \{\tilde{i} | (\tilde{i}, \tilde{j}) \in M, \tilde{j} \in \tilde{E}_b(y)\}$$

Here, $J_V(x)$ indicates the set of image vertexes of subtree $T_a(x)$. $I_V(y)$ indicates the set of inverse image vertexes of subtree $T_b(y)$. Similarly, $J_E(\tilde{x})$ indicates the set of image edges of subtree $\tilde{T}_a(x)$ are mapped. $I_E(\tilde{y})$ indicates the set of inverse image edges of subtree $\tilde{T}_b(y)$.

Assuming that the smallest subtree including $J_V(x)$ is $T_b(y_x)$. Note that $y_x$ is the root of the subtree $T_b(y_x)$. When $J_V(x)=\Phi$, $y_x$ cannot be decided. Similarly, $x_y$ is defined. $T_a(x_y)$ is the smallest subtree including $I_V(y)$. We can say $T_b(yx)$ is the smallest subtree of $T_b$ that includes all of mapping vertexes of the subtree $T_a(x)$, and $T_a(x_y)$ is the smallest subtree of $T_a$ that includes all of the mapping vertexes of the subtree $T_b(y)$. With regard to edges, the smallest subtree including $J_E(\tilde{x})$ is denoted by $\tilde{T}_b(y_{\tilde{x}})$. Note that $y_{\tilde{x}}$ is the root of the subtree $\tilde{T}_b(y_{\tilde{x}})$. When $J_E(\tilde{x})=\Phi$, $y_{\tilde{x}}$ cannot be decided. Similarly, $x_{\tilde{y}}$ is defined. $\tilde{T}_a(x_{\tilde{y}})$ is the smallest subtree including $I_E(\tilde{y})$.

In the beginning, a description will now be made of the method for calculating the distance between the RO trees based on the correspondence relationship between the vertexes and the edges.

Assuming that a predetermined condition, which a mapping M between RO trees should satisfy, includes the following conditions. Also, with regard to a mapping M between ordered forests $\tilde{F}_a(x)$ and $\tilde{F}_b(y)$, $M \cup \{(x, y)\}$ satisfies the following mapping conditions (a1) to (a11).

Figure 11A:
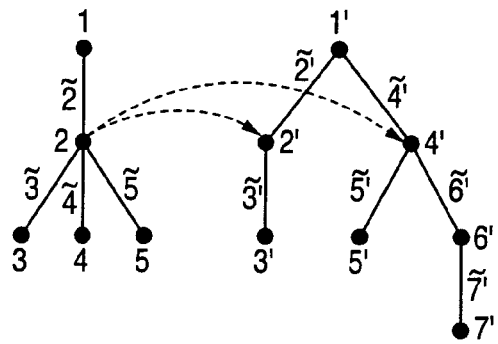
FIG. 11 shows various mappings between two trees.
Figure 11B:
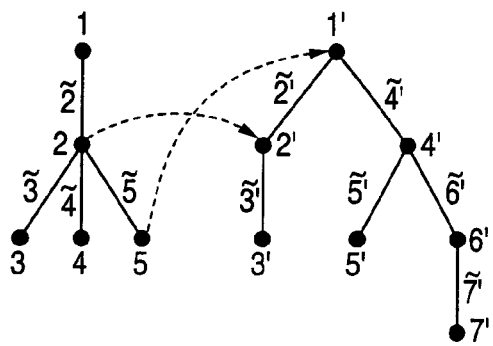
Figure 11C:
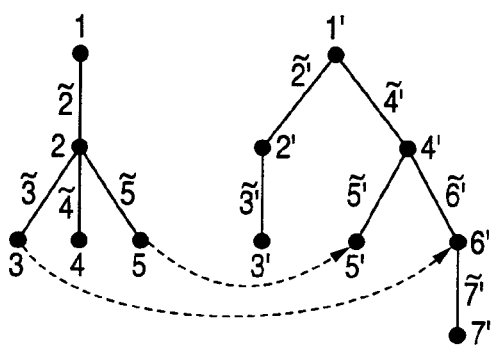
Figure 11D:
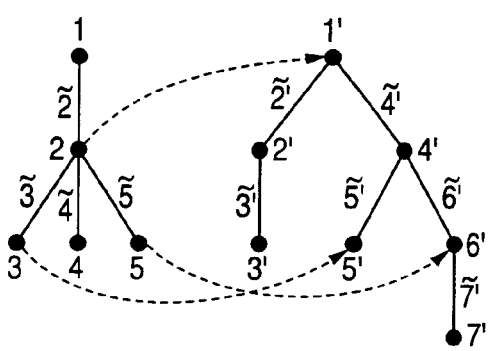
Figure 11E:
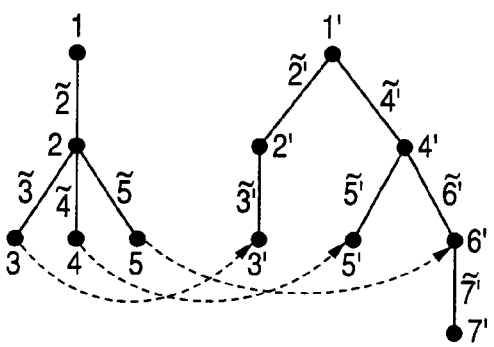
Figure 11F:
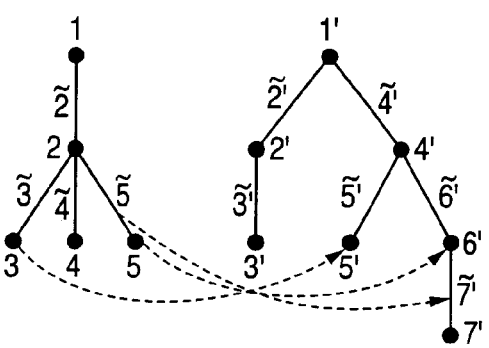
Figure 11G:
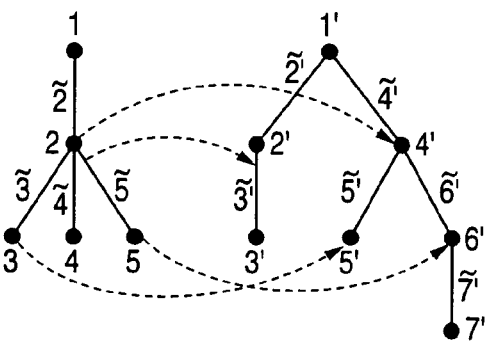
Figure 11H:
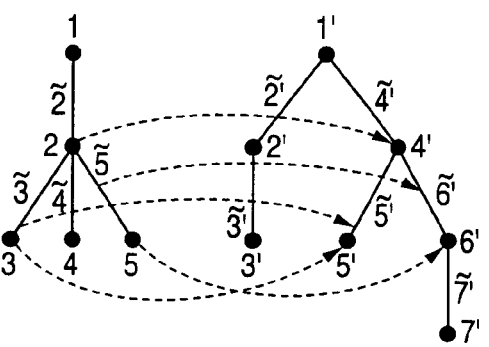

For any $(x_1, y_1) \in M, (X_2, y_2) \in M$,
(a1) $x_1=x_2$ iff $y_1=y_2$
(a2) $x_1 \in An(x_2)$ iff $y_1 \in An(y_2)$
(a3) "$x_1$ is located on left of $x_2$" iff "$y_1$ is located on left of $y_2$"
For any mapping vertexe $x_1$ and any vertex $x_2$ in $T_a$,
(a4) if $y_{x1}$ and $y_{x2}$ can be decided, $x_1 \in An(x_2)$ iff $y_{x1} \in An(y_{x2})$ and $sep(x_1, X_2)$ iff $sep(y_{x1}, y_{x2})$
For any mapping vertex $y_1$ and any vertex $y_2$ in $T_b$,
(a5) if $x_{y1}$ and $xy_2$ can be decided, $_{xy1} \in An(x_{y2})$ iff $y_1 \in An(y_2)$ and $sep(x_{y1}, x_{y2})$ iff $sep(y_1, Y_2)$
For any $(\tilde{x}_1, \tilde{y}_1) \in M, (\tilde{x}_2, \tilde{y}_2) \in M$,
(a6) $\tilde{x}_1=\tilde{x}_2$ iff $\tilde{y}_1=\tilde{y}_2$
(a7) $\tilde{x}_1 \in An(\tilde{x}_2)$ iff $\tilde{y}_1 \in An(\tilde{y}_2)$
(a8) "$\tilde{x}_1$ is located on left of $\tilde{x}_2$" iff "$\tilde{y}_1$ is located on left of $\tilde{y}_2$"
For any mapping edge $\tilde{x}_1$ and any edge $\tilde{x}_2$ in $T_a$,
(a9) if $y_{\tilde{x}1}$ and $y_{\tilde{x}2}$ can be decided, $\tilde{x}_1 \in An(\tilde{x}_2)$ iff $y_{\tilde{x}1} \in An(y_{\tilde{x}2})$ and $sep(\tilde{x}_1, \tilde{x}_2)$ iff $sep(y_{\tilde{x}1}, y_{\tilde{x}2})$
For any mapping edge $\tilde{y}_1$ and any edge $Y_2$ in $T_b$,
(a10) if $x_{\tilde{y}1}$ and $x_{\tilde{y}2}$ can be decided, $x_{\tilde{y}1} \in An(x_{\tilde{y}2})$ iff $\tilde{y}_1 \in An(\tilde{y}_2)$ and $sep(x_{\tilde{y}1}, x_{\tilde{y}2})$ iff $sep(\tilde{y}_1, \tilde{y}_2)$
(a11) if $(\tilde{x}, \tilde{y}) \in M$, $J_V(x) \in T_b(y) J_E(\tilde{x}) \in \tilde{T}_b(y)$, $I_V(y) \in T_a(x)$ and $I_E(\tilde{y}) \in \tilde{T}_a(x)$ (a1) and (a6) are one-to-one mapping conditions. (a2) and (a7) guarantees the mapping to preserve the relation between ancestors and descendants. A mapping shown in FIG. 11A is one-to-many mapping and therefore, is prohibited. Also, since a mapping shown in FIG. 11B does not preserve the relation between ancestors and descendants, this mapping does not meet (a2). (a3) and (a8) guarantee the mapping to preserve the relation between left and right. With regard to a mapping shown in FIG. 11C, although a vertex 5 is located on right of a vertex 3, the image 5' is located on left of the image 6'. This mapping is a mapping not preserving the relation between left and right. (a4), (a5), (a9), and (a10) guarantee the mapping images of two subtrees, which are separated from each other, and/or inverse images of the two subtrees are separated from each other. A mapping shown in FIG. 11D meets (a1) to (a3). However, for vertexes 1' and 4', both the smallest subtrees including inverse images of subtrees $T_b(1')$ and $T_b(4')$ are subtree $T_a(2)$ and the vertex 1' is an ancestor of the vertex 4'. Therefore, this mapping does not meet the mapping condition (a5). A mapping shown in FIG. 11E also does not meet (a5). The mapping condition (a11) prohibits mapping between vertexes and mapping between edges from intersecting with each other. The mapping condition (a11) guarantees that the smallest subtree including an image of a mapping vertex in a subtree is not separated from the smallest subtree including an image of a mapping edge in the same subtree. For example, with regard to a mapping shown in FIG. 11F, a mapping from a vertex 5 to a vertex 6' intersect with a mapping from an edge $\tilde{5}$ edge $\tilde{7}$. Therefore, this mapping is prohibited. With regard to a mapping $M=\{(2,4'), (3,5'), (5,6'), (\tilde{5},\tilde{3}')\}$ shown in FIG. 11G, regard less of mapping an edge $\tilde{5}$ to an edge $\tilde{3}'$ $((\tilde{5},\tilde{3}') \in M)$, the smallest subtree $T_b$ (6') including images of all mapping vertexes in $\tilde{T}_a(5)$ is separated from the smallest subtree $\tilde{T}_b(3')$ including images of all mapping edges. Therefore, this mapping does not meet the mapping condition (a11). A mapping $M=\{(2,4'), (3,5'), (5,6'), (\tilde{3},\tilde{5}'), (\tilde{5},\tilde{6}').\}$ shown in FIG. 11H satisfies the above mapping conditions (a1) to (a11).

FIG. 6A to FIG. 6D show four modes of two subtrees, which are RO trees.

Figure 6A:
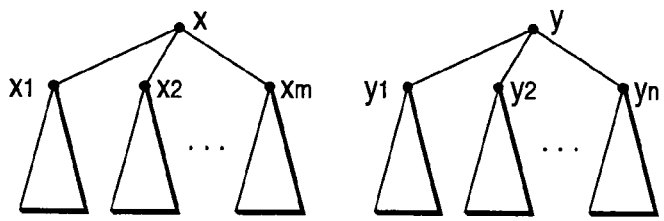
FIG. 6 is a diagram for indicating an example of two subtrees which are constituted by either RO trees or R trees.

With respect to a distance between subtrees, which are RO trees, and a distance between ordered forests, the following definitions are made:

A distance between two subtrees $T_a(x)$ and $T_b(y)$, which are the RO trees, shown in FIG. 6A is expressed by $D(T_a(x), T_b(y))$.

Figure 6B:
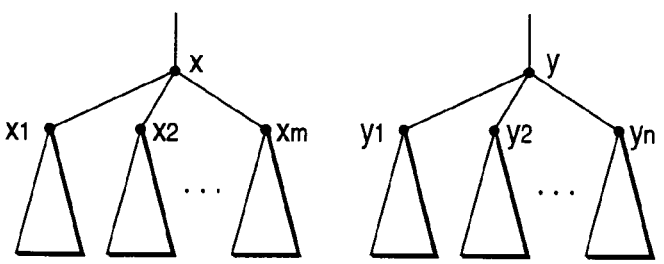

A distance between two subtrees $\tilde{T}_a(x)$ and $\tilde{T}_b(y)$, which are the RO trees, shown in FIG. 6B is expressed by $D(\tilde{T}_a(x), \tilde{T}_b(y))$.

Figure 6C:
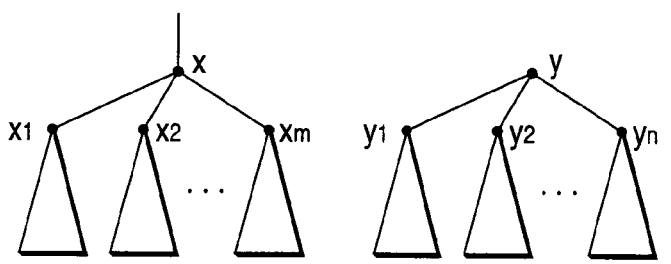

A distance between two subtrees $T_a(x)$ and $\tilde{T}_b(y)$, which are the RO trees, shown in FIG. 6C is expressed by $D(\tilde{T}_a(x), T_b(y))$.

Figure 6D:
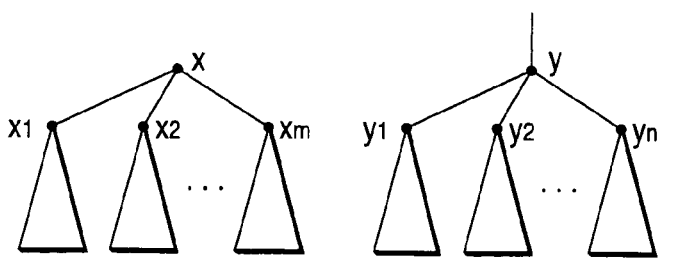

A distance between two subtrees $\tilde{T}_a(x)$ and $T_b(y)$, which are the RO trees, shown in FIG. 6D is expressed by $D(\tilde{T}_a(x), T_b(y))$.

Among all mappings from $T_a(x)$ to $T_b(y)$ satisfying the mapping conditions (a1) to (a11), the minimum value of weight, which is required for the mapping, is defined as the distance $D(T_a(x), T_b(y))$. Among all mappings from $\tilde{T}_a(x)$ to $\tilde{T}_b(y)$ satisfying the mapping conditions (a1) to (a11), the minimum value of weight, which is required for the mapping, is defined as the distance $D(\tilde{T}_a(x), \tilde{T}_b(y))$. Among all mappings from $\tilde{T}_a(x)$ to $T_b(y)$ satisfying the mapping conditions (a1) to (a11), the minimum value of weight, which is required for the mapping, is defined as the distance $D(\tilde{T}_a(x), \tilde{T}_b(y))$. Among all mappings from $T_a(x)$ to $\tilde{T}_b(y)$ satisfying the mapping conditions (a1) to (a11), the minimum value of weight, which is required for the mapping, is defined as the distance $D(T_a(x), \tilde{T}_b(y))$. Similarly, among all mappings from forest $\tilde{F}_a(x)$ to forest $\tilde{F}_b(y)$ satisfying the mapping conditions (a1) to (a11), the minimum value of weight, which is required for the mapping, is defined as the distance $D(\tilde{F}_a(x), \tilde{F}_b(y))$.

The method for obtaining the distance between RO trees first allots numbers to vertexes and edges from the root of the RO tree by the way of depth priority searching. Compute the distance between the smallest subtrees (consists of one vertex) firstly, and then using the above results, compute the distance between larger subtrees, and finally, we can get the distance between the two RO trees.

We can obtain the distances between the two RO trees shown in FIG. 6A to FIG. 6D using the following formulae 1 to 4. In this case, symbol "A-B" shown in the formulae 1 to 4 indicate a function for removing all components of a set B from a set A.

Also, it is assumed that a distance between ordered forests $D(\tilde{F}_a(x), \tilde{F}_b(y))$, distances between all subtrees $D(T_a(x_i), T_b(y))$, $D(\tilde{T}_a(x_i), \tilde{T}_b(y))$, $D(\tilde{T}_a(x_i), T_b(Y))$, $D(T_a(x), T_b(y_j))$, $D(\tilde{T}_a(x), \tilde{T}_b(y_j))$, $D(\tilde{T}_a(x), T_b(y_j))$, $D(T_a(x), \tilde{T}_b(y_j))$, have already been obtained.

As can be seen from the tree structure expression method and the conversion method of the text sentence described above, vertexes x and y indicate words (including attributes of words) appeared in the text sentence. Edges $\tilde{x}$ and $\tilde{y}$ indicate dependency relation information (case information) between words of the text sentence. Also, a function $\delta(x, y)$ represents a vertex substitution weight and can be obtained using the word substitution weight. Also, a function $q(y)$ represents an insertion weight of a vertex y and can be obtained using the word insertion weight. Also, a function $r(x)$ represents a deletion weight of a vertex x and can be obtained using the word deletion weight.

Edges are defined as follows.

A function $\delta(\tilde{x}, \tilde{y})$ represents an edge substitution weight and can be obtained using the case substitution weight. A function $q(\tilde{y})$ represents an insertion weight of an edge $\tilde{y}$ and can be obtained using the case insertion weight. A function $r(\tilde{x})$ represents a deletion weight of an edge $\tilde{x}$ and can be obtained using the case deletion weight.

The vertex substitution weight, the vertex insertion weight, the vertex deletion weight, the case substitution weight, the case insertion weight, and the case deletion weight are not negative value and satisfy $\delta(x, y) < r(x) + q(y)$ and $\delta(\tilde{x}, \tilde{y}) < r(\tilde{x}) + q(\tilde{y})$.

$$D(T_a(x), T_b(y)) = \min \begin{cases} \delta(x, y) + D(\tilde{F}_a(x), \tilde{F}_b(y)), \\ \min_{x_i \in Ch(x)} \{D(\tilde{T}_a(x), T_b(y))+ \\ \sum r(k) | k \in (V_a(x) - V_a(x_i)) + \\ \sum r(\tilde{k}) | \tilde{k} \in (E_a(x) - \tilde{E}_a(x_i))\}, \\ \min_{y_j \in Ch(y)} \{D(T_a(x), \tilde{T}_b(y_j))+ \\ \sum q(k) | k \in (V_b(y) - V_b(y_j)) + \\ \sum q(\tilde{k}) | \tilde{k} \in (E_b(y) - \tilde{E}_b(y_j))\}, \end{cases} \quad (1)$$

$$D(\tilde{T}_a(x), \tilde{T}_b(y)) = \min \begin{cases} \delta(x, y) - \delta(\tilde{x}, \tilde{y}) + D(\tilde{F}_a(x), \tilde{F}_b(y)), \\ \min_{x_i \in Ch(x)} \begin{cases} \min\{D(T_a(x_i), T_b(y)) + \delta(\tilde{x}, \tilde{y}), \\ D(\tilde{T}_a(x_i), \tilde{T}_b(y))\} - \\ \sum r(k) | k \in (\tilde{V}_a(x) - \tilde{V}_a(x_i)) + \\ \sum r(\tilde{k}) | \tilde{k} \in (\tilde{E}_a(x) - \tilde{E}_a(x_i)) \end{cases}, \\ \min_{y_j \in Ch(y)} \begin{cases} \min\{D(T_a(x), T_b(y_j)) + \delta(\tilde{x}, \tilde{y}), \\ D(\tilde{T}_a(x), \tilde{T}_b(y_j))\} + \\ \sum q(k) | k \in (\tilde{V}_b(y) - \tilde{V}_b(y_j)) + \\ \sum q(\tilde{k}) | \tilde{k} \in (\tilde{E}_b(y) - \tilde{E}_b(y_j)) \end{cases}, \end{cases} \quad (2)$$

$$D(\tilde{T}_a(x), T_b(y)) = \min \begin{cases} \delta(x, y) + \tilde{r} + D(\tilde{F}_a(x), \tilde{F}_b(y)), \\ \min_{x_i \in Ch(x)} \{D(\tilde{T}_a(x_i), T_b(y))+ \\ \sum r(k) | k \in (V_a(x) - V_a(x_i)) + \\ \sum r(\tilde{k}) | \tilde{k} \in (\tilde{E}_a(x) - \tilde{E}_a(x_i))\}, \\ \min_{y_j \in Ch(y)} \{D(\tilde{T}_a(x), T_b(y_j))+ \\ \sum q(k) | k \in (V_b(y) - V_b(y_j)) + \\ \sum q(\tilde{k}) | \tilde{k} \in (E_b(y) - \tilde{E}_b(y_j))\} \end{cases} \quad (3)$$

$$D(T_a(x), \tilde{T}_b(y)) = \min \begin{cases} \delta(x, y) + \tilde{q} + D(\tilde{F}_a(x), \tilde{F}_b(y)), \\ \min_{x_i \in Ch(x)} \{D(\tilde{T}_a(x_i), T_b(y))+ \\ \sum r(k) | k \in (V_a(x) - V_a(x_i)) + \\ \sum r(\tilde{k}) | \tilde{k} \in (E_a(x) - \tilde{E}_a(x_i))\}, \\ \min_{y_j \in Ch(y)} \{D(T_a(x), \tilde{T}_b(y_j))+ \\ \sum q(k) | k \in (V_b(y) - V_b(y_j)) + \\ \sum q(\tilde{k}) | \tilde{k} \in (E_b(y) - \tilde{E}_b(y_j))\} \end{cases} \quad (4)$$

Figure 7:
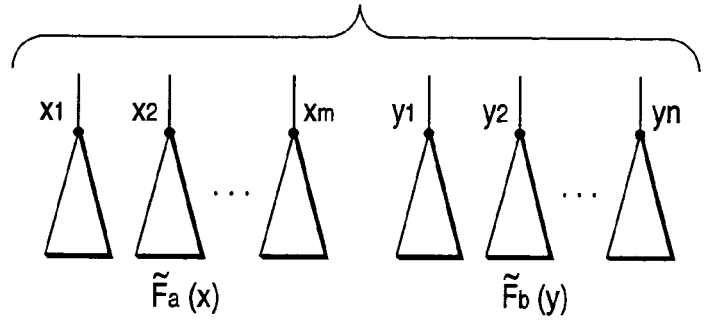
FIG. 7 is a diagram for indicating an example of two forests which are constituted by either RO trees or R trees.

FIG. 7 indicates, for example, two ordered forests. A distance between these forests $D(\tilde{F}_a(x), \tilde{F}_b(y))$ can be calculated using the following formula 5. In this case, symbol |A| indicates total number of components of a set A.

(5-1) boundary condition ($1 \leq i \leq |Ch(x)|$, $1 \leq j \leq |Ch(y)|$)

$d1(0,0) = 0;$ $d1(i,0) = d1(i-1,0) + \Sigma r(k) | k \in V_a(x) + \Sigma r(\tilde{k}) | \tilde{k} \in \tilde{E}(x);$ $d1(0,j) = d1(0,j-1) + \Sigma q(k) | k \in V_b(y_j) + \Sigma q(\tilde{k}) | \tilde{k} \in \tilde{E}(y_j);$ (5-2) calculation of d1(i, j) ($1 \leq i \leq |Ch(x)|$, $1 \leq j \leq |Ch(y)|$)

$$d1(i, j) = \min \begin{cases} d1(i-1, j-1) + D(\tilde{T}_a(x_i), \tilde{T}_b(y_j)), \\ d1(i, j-1) + \sum q(k) | k \in V_b(y_j) + \sum q(\tilde{k}) | \tilde{k} \in \tilde{E}_b(y_j), \\ d1(i-1, j) + \sum r(k) | k \in V_a(x_i) + \sum r(\tilde{k}) | \tilde{k} \in \tilde{E}_a(x_i) \end{cases};$$

(5-3)

$$D(\tilde{F}_a(x), \tilde{F}_b(y)) = d1(|Ch(x)|, |Ch(y)|). \quad (5)$$

With regard to the formula 1, when the vertex x is a leaf (Ch(x)=Null: empty set), apparently, since a second term of the right hand of the formula 1 need not be calculated, the distance $D(T_a(x), T_b(y))$ can be calculated using formula 6.

Also, in the formula 1, when the vertex y is a leaf (Ch(y)=Null: empty set), apparently, since a third term of the right hand of the formula 1 need not be calculated, the distance $D(T_a(x), T_b(y))$ can be calculated using formula 7.

$$D(T_a(x), T_b(y)) = \min \begin{cases} \delta(x, y) + D(\tilde{F}_a(x), \tilde{F}_b(y)), \\ \min_{y_j \in Ch(y)} \{D(T_a(x), \tilde{T}_b(y_j))+ \\ \sum q(k) | k \in (V_b(y) - V_b(y_j)) + \\ \sum q(\tilde{k}) | \tilde{k} \in (E_b(y) - \tilde{E}_b(y_j))\} \end{cases} \quad (6)$$

$$D(T_a(x), T_b(y)) = \min \begin{cases} \delta(x, y) + D(\tilde{F}_a(x), \tilde{F}_b(y)), \\ \min_{x_i \in Ch(x)} \{D(\tilde{T}_a(x_i), T_b(y))\} + \\ \sum r(k) \mid k \in (V_a(x) - V_a(x_i)) + \\ \sum r(\tilde{k}) \mid \tilde{k} \in (E_a(x) - \tilde{E}_a(x_i)) \end{cases} \quad (7)$$

Similarly, in the formula 2, when the vertex x is a leaf (Ch(x)=Null: empty set), apparently, since a second term of the right hand of the formula 2 need not be calculated, the distance can be calculated using formula 8.

Also, in the formula 2, when the vertex y is a leaf (Ch(y)=Null: empty set), apparently, since a third term of the right hand of the formula 2 need not be calculated, the distance can be calculated using formula 9.

$$D(\tilde{T}_a(x), \tilde{T}_b(y)) = \qquad (8)$$

$$\min \begin{cases} \delta(x, y) + \delta(\tilde{x}, \tilde{y}) + D(\tilde{F}_a(x), \tilde{F}_b(y)), \\ \min_{x_i \in Ch(x)} \begin{cases} \min\{D(T_a(x_i), T_b(y)) + \delta(\tilde{x}, \tilde{y}), \\ D(\tilde{T}_a(x_i), \tilde{T}_a(y))\} + \\ \sum r(k) \mid k \in (\tilde{V}_a(x) - \tilde{V}_a(x_i)) + \\ \sum r(\tilde{k}) \mid \tilde{k} \in (\tilde{E}_a(x) - \tilde{E}_a(x_i)) \end{cases} \end{cases}$$

$$D(\tilde{T}_a(x), \tilde{T}_b(y)) = \qquad (9)$$

$$\min \begin{cases} \delta(x, y) + \delta(\tilde{x}, \tilde{y}) + D(\tilde{F}_a(x), \tilde{F}_b(y)), \\ \min_{x_i \in Ch(x)} \begin{cases} \min\{D(T_a(x_i), T_b(y)) + \delta(\tilde{x}, \tilde{y}), \\ D(\tilde{T}_a(x_i), \tilde{T}_a(y))\} + \\ \sum r(k) \mid k \in (\tilde{V}_a(x) - \tilde{V}_a(x_i)) + \\ \sum r(\tilde{k}) \mid \tilde{k} \in (\tilde{E}_a(x) - \tilde{E}_a(x_i)) \end{cases} \end{cases}$$

Similarly, in the formula 3, when the vertex x is a leaf (Ch(x)=Null: empty set), apparently, since a second term of the right hand of the formula 3 need not be calculated, the distance can be calculated using formula 10.

Also, in the formula 3, when the vertex y is a leaf (Ch(y)=Null: empty set), apparently, since a third term of the right hand of the formula 3 need not be calculated, the distance can be calculated using formula 11.

$$D(\tilde{T}_a(x), T_b(y)) = \min \begin{cases} \delta(x, y) + \tilde{r} + D(\tilde{F}_a(x), \tilde{F}_b(y)), \\ \min_{y_j \in Ch(y)} \{D(\tilde{T}_a(x), \tilde{T}_b(y_j))\} + \\ \sum q(k) \mid k \in (V_b(y) - V_b(y_j)) + \\ \sum q(\tilde{k}) \mid \tilde{k} \in (E_b(y) - \tilde{E}_b(y_j)) \end{cases} \quad (10)$$

$$D(\tilde{T}_a(x), T_b(y)) = \min \begin{cases} \delta(x, y) + \tilde{r} + D(\tilde{F}_a(x), \tilde{F}_b(y)), \\ \min_{x_i \in Ch(x)} \{D(\tilde{T}_a(x_i), T_b(y))\} + \\ \sum r(k) \mid k \in (V_a(x) - V_a(x_i)) + \\ \sum r(\tilde{k}) \mid \tilde{k} \in (\tilde{E}_a(x) - \tilde{E}_a(x_i)) \end{cases}, \quad (11)$$

Similarly, in the formula 4, when the vertex x is a leaf (Ch(x)=Null: empty set), apparently, since a second term of the right hand of the formula 4 need not be calculated, the distance can be calculated using formula 12.

Also, in the formula 4, when the vertex y is a leaf (Ch(y)=Null: empty set), apparently, since a third term of the right hand of the formula 4 need not be calculated, the distance can be calculated using formula 13.

$$D(T_a(x), \tilde{T}_b(y)) = \min \begin{cases} \delta(x, y) + \tilde{q} + D(\tilde{F}_a(x), \tilde{F}_b(y)), \\ \min_{y_j \in Ch(y)} \{D(T_a(x), \tilde{T}_b(y_j))\} + \\ \sum q(k) \mid k \in (V_b(y) - V_b(y_j)) + \\ \sum q(\tilde{k}) \mid \tilde{k} \in (E_b(y) - \tilde{E}_b(y_j)) \end{cases} \quad (12)$$

$$D(T_a(x), \tilde{T}_b(y)) = \min \begin{cases} \delta(x, y) + \tilde{q} + D(\tilde{F}_a(x), \tilde{F}_b(y)), \\ \min_{x_i \in Ch(x)} \{D(\tilde{T}_a(x_i), \tilde{T}_b(y))\} + \\ \sum r(k) \mid k \in (V_a(x) - V_a(x_i)) + \\ \sum r(\tilde{k}) \mid \tilde{k} \in (E_a(x) - \tilde{E}_a(x_i)) \end{cases} \quad (13)$$

Next, a description will now be made on the method for calculating a distance between R trees based on the correspondence relation between vertexes and edges. It should be noted that the expression of symbols are substantially same as that in the method for calculating the distance between RO trees described above. Therefore, description concerning the expression of symbols is omitted.

Assuming that a predetermined condition, which a mapping M between R trees should satisfy, includes the following conditions. Also, with regard to a mapping M between unordered forests $\tilde{F}_a(x)$ and $\tilde{F}_b(y)$, $M \cup \{(x, y)\}$ satisfies the following mapping conditions (b1) to (b9).

For any $(x_1, y_1) \in M$, $(x_2, y_2) \in M$,
(b1) $x_1 = x_2$ iff $y_1 = y_2$
(b2) $x_1 \in An(x_2)$ iff $y_1 \in An(y_2)$
For any mapping vertexe $x_1$ and any vertex $x_2$ in $T_a$,
(b3) if $y_{x1}$ and $y_{x2}$ can be decided, $x_1 \in An(x_2)$ iff $y_{x1} \in An(y_{x2})$ and $sep(x_1, x_2)$ iff $sep(y_{x1}, Y_{x2})$
For any mapping vertex $y_1$ and any vertex $y_2$ in $T_b$,
(b4) if $x_{y1}$ and $x_{y2}$ can be decided, $x_{y1} \in An(x_{y2})$ iff $y_1 \in An(y_2)$ and $sep(x_{y1}, x_{y2})$ iff $sep(y_1, y_2)$
For any $(\tilde{x}_1, \tilde{y}_1) \in M$, $(\tilde{x}_2, \tilde{y}_2) \in M$
(b5) $\tilde{x}_1 = \tilde{x}_2$ iff $\tilde{y}_1 = \tilde{y}_2$
(b6) $\tilde{x}_1 \in An(\tilde{x}_2)$ iff $\tilde{y}_1 \in An(\tilde{y}_2)$
For any mapping edge $\tilde{x}_1$ and any edge $\tilde{x}_2$ in $T_a$,
(b7) if $y_{\tilde{x}1}$ and $y_{\tilde{x}2}$ can be decided, $\tilde{x}_1 \in An(\tilde{x}_2)$ iff $y_{\tilde{x}1} \in An(y_{\tilde{x}2})$ and $sep(\tilde{x}_1, \tilde{x}_2)$ iff $sep(y_{\tilde{x}1}, y_{\tilde{x}2})$
For any mapping edge $\tilde{y}_1$ and any edge $y_2$ in $T_b$,
(b8) if $x_{\tilde{y}1}$ and $x_{\tilde{y}2}$ can be decided, $x_{\tilde{y}1} \in An(x_{\tilde{y}2})$ iff $\tilde{y}_1 \in An(\tilde{y}_2)$ and $sep(x_{\tilde{y}1}, x_{\tilde{y}2})$ iff $sep(\tilde{y}_1, \tilde{y}_2)$
(b9) if $(\tilde{x}, \tilde{y}) \in M$, $J_V(x) \in T_b(y)$, $J_E(\tilde{x}) \in \tilde{T}_b(y)$, $I_V(y) \in T_a(x)$ and $I_E(\tilde{y}) \in \tilde{T}_a(x)$ (b1) and (b5) are one-to-one mapping conditions. (b2) and (b6) guarantees the mapping to preserve the relation between ancestors and descendants. (b3), (b4), (b7), and (b8) guarantee the mapping images of two subtrees, which are separated from each other, and/or inverse images of the two subtrees are separated from each other. The mapping condition (b9) means, if $\tilde{x}$ maps to $\tilde{y}$, then subtree $\tilde{T}_a(x)$ must map to $\tilde{T}_b(y)$, and $\tilde{T}_b(y)$ must be mapped from $\tilde{T}_a(x)$.

Among all mappings from $T_a(x)$ to $T_b(y)$ satisfying the mapping conditions (b1) to (b9), the minimum value of weight, which is required for the mapping, is defined as the distance $D(T_a(x), T_b(y))$. Among all mappings from $\tilde{T}_a(x)$ to $\tilde{T}_b(y)$ satisfying the mapping conditions (b1) to (b9), the minimum value of weight, which is required for the mapping, is defined as the distance $D(\tilde{T}_a(x), \tilde{T}_b(y))$. Among all mappings from $\tilde{T}_a(x)$ to $T_b(y)$ satisfying the mapping conditions (b1) to (b9), the minimum value of weight, which is required for the mapping, is defined as the distance $D(\tilde{T}_a(x), T_b(y))$. Among all mappings from $T_a(x)$ to $\tilde{T}_b(y)$ satisfying the mapping conditions (b1) to (b9), the minimum value of weight, which is required for the mapping, is defined as the distance $D(T_a(x), \tilde{T}_b(y))$. Similarly, among all mappings from a forest $\tilde{F}_a(x)$ to a forest $\tilde{F}_b(y)$ satisfying the mapping conditions (b1) to (b9), the minimum value of weight, which is required for the mapping, is defined as the distance $D(\tilde{F}_a(x), \tilde{F}_b(y))$.

The method for obtaining the distance between R trees first allots numbers to vertexes and edges from the root of the R tree by way of depth priority searching. Compute the distance between the smallest subtrees (consist of one vertex), firstly, and then using the above results, compute the distance between larger subtrees and finally we can get the distance between the two R trees.

Also, it is assumed that a distance between ordered forests $D(\tilde{F}_a(x), \tilde{F}_b(Y))$, distances between all subtrees $D(T_a(x_i), T_b(y))$, $D(\tilde{T}_a(x_i), T_b(y))$, $D(\tilde{T}_a(x_i), \tilde{T}_b(y))$, $D(T_a(x_i), \tilde{T}_b(y))$, $D(T_a(x), T_b(y_j))$, $D(\tilde{T}_a(x), \tilde{T}_b(y_j))$, $D(\tilde{T}_a(x), T_b(y_j))$, $D(T_a(x), \tilde{T}_b(y_j))$ have already been obtained. Definitions of the vertex substitution weight $\delta(x, y)$, the vertex insertion weight $q(y)$, the vertex deletion weight $r(x)$, the edge insertion weight $\delta(\tilde{x}, \tilde{y})$, the edge insertion weight $q(\tilde{y})$, and the edge deletion weight $r(\tilde{x})$ are the same as those for RO trees.

A distance $D(T_a(x), T_b(y))$ between two subtrees $T_a(x)$ and $T_b(y)$, which are R trees, shown in FIG. 6A can be calculated using the formula 1. A distance $D(\tilde{T}_a(x), \tilde{T}_b(y))$ between two subtrees $\tilde{T}_a(x)$ and $\tilde{T}_b(y)$, which are R trees, shown in FIG. 6B can be calculated using the formula 2. A distance $D(\tilde{T}_a(x), T_b(y))$ between two subtrees $\tilde{T}_a(x)$ and $T_b(y)$, which are R trees, shown in FIG. 6C can be calculated using the formula 3. A distance $D(T_a(x), T_b(\tilde{y}))$ between two subtrees $T_a(x)$ and $T_b(\tilde{y})$, which are R trees, shown in FIG. 6D can be calculated using the formula 4.

A distance $D(\tilde{F}_a(x), \tilde{F}_b(y))$ between two unordered forest shown in FIG. 7, can be calculated using a formula 14.

$$D(\tilde{F}_a(x), \tilde{F}_b(y)) = \sum_{x_i \in Ch(x)} \left( \sum r(k) \mid k \in V_a(x_i) + \sum r(\tilde{k}) \mid \tilde{k} \in \tilde{E}_a(x_i) \right) + \quad (14)$$
$$\sum_{y_j \in Ch(y)} \left( \sum q(k) \mid k \in V_b(y_j) + \sum q(\tilde{k}) \mid \tilde{k} \in \tilde{E}_b(y_j) \right) - W(M_{max})$$

Figure 8:
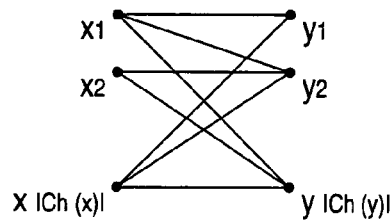
FIG. 8 is a diagram for showing an example of a weighted bipartite graph.

Where, symbol $W(M_{max})$ shown in the formula 14 is a maximum weight matching of a weighted bipartite graph $G(X, Y, E)$ as shown in FIG. 8.

Also, a weight $w(e(x_i, y_j))$ of an edge $e(x_i, y_j)$ between the vertex $x_i(\in x)$ and the vertex $y_j(\in Y)$ of the weighted bipartite graph $G(X, Y, E)$ are set in accordance with the following formula 15.

$$w(e(x_i,y)) = \Sigma r(k) \mid k \in V_r(\alpha) + \Sigma r(\tilde{k}) \mid \tilde{k} \in \tilde{E}(\alpha) + \Sigma q(k) \mid k \in V_r(\gamma) + \Sigma q(\tilde{k}) \mid \tilde{k} \in \tilde{E}(\gamma) - D(\tilde{T}_a(x), \tilde{T}_b(\gamma)) \quad (15)$$

It should be understood that the vertex $x_i(\in X)$ of the weighted bipartite graph $G(X, Y, E)$ represents a subtree $\tilde{T}_a(x_i)(x_i \in Ch(x))$, which constitutes the unordered forest $\tilde{F}_a(x)$. The vertex $y_j(\in Y)$ of the weighted bipartite graph $G(X, Y, E)$ indicates a subtree $\tilde{T}_a(y_j)(y_j \in Ch(y))$, which constitutes the unordered forest $\tilde{F}_b(y)$.

[Calculation Procedure of the Distance Between RO Trees]

Next, a procedure for converting text sentences $S_1$ and $S_2$ into RO trees to obtain a distance between the text sentences $S_1$ and $S_2$ will be described with reference to a flow chart shown in FIG. 12.

The input two text sentences $S_1$ and $S_2$ are converted into RO trees $T_a$ and $T_b$ by using the morphological analysis section 2, the semantic analysis section 3, and the tree structure conversion section 4 (S01). As shown in FIG. 4, the word information are allotted to vertexes of the trees $T_a$ and $T_b$ and the case information are allotted to edges of trees $T_a$ and $T_b$. Numbers from 1 to n are allotted to vertexes and edges of the RO trees $T_a$ and $T_b$ (n denotes a positive integer). The numbers are allotted in the depth first order from the root of the RO tree (S02).

Next, x is set n1 and y is set n2 (n1 and n2 are number of the vertexes of the tree $T_a$ and number of the vertexes of the tree $T_b$, respectively) (S03 and S04). The distance $D(\tilde{F}_a(x), \tilde{F}_b(y))$ between an ordered forest $\tilde{F}_a(x)$ and an ordered forest $\tilde{F}_b(y)$ are calculated using the formula 5 (S05). Incidentally, when distances between trees, between subtrees, and between forests are calculated, the distance calculation section 7 obtains the vertex substitution weight $\delta(x, y)$, the vertex deletion weight $q(y)$, the vertex insertion weight $r(x)$, the edge substitution weight $\delta(\tilde{x}, \tilde{y})$, the edge deletion weight $q(\tilde{y})$, and the edge insertion weight $r(\tilde{x})$ from the word-mapping-weight calculation section 5 and the case-mapping-weight calculation section 6 to calculate the distance.

Subsequently, it is judged as to whether or not a subtree $T_a(x)$ (or $\tilde{T}_a(x)$) is a subtree consisting of one vertex (S06). If yes, the process proceeds to S08. On the contrary, if no, the process proceeds to S07.

In the S07, it is judged as to whether or not a subtree $T_b(y)$ (or $\tilde{T}_b(y)$) is a subtree consisting of one vertex. If yes, the process proceeds to S09. On the contrary, if no, the process proceeds to S10.

In the S08, first it is judged as to whether or not the vertex y is the root of the tree $T_b$. Then, when the vertex y is not the root of the tree $T_b$, the distance calculation section 7 calculates the distances between subtrees in the RO trees $D(T_a(x), T_b(y))$, $D(\tilde{T}_a(x), \tilde{T}_b(y))$, $D(\tilde{T}_a(x), T_b(y))$, $D(T_a(x), \tilde{T}_b(y))$ using the formulae (6), (8), (10), and (12), respectively. On the contrary, when the vertex y is the root of the tree $T_b$, the distance calculation section 7 calculates the distances between subtrees in the RO trees $D(T_a(x), T_b(y))$ and $D(\tilde{T}_a(x), T_b(y))$, using the formulae (6) and (10), respectively. After the distance calculation section 7 calculates each distance, the process proceeds to S11.

In the S09, first it is judged as to whether or not the vertex x is the root of the tree $T_a$. Then, when the vertex x is not the root of the tree $T_a$, the distance calculation section 7 calculates the distances between subtrees in the RO trees $D(T_a(x), T_b(y))$, $D(\tilde{T}_a(x), \tilde{T}_b(y))$, $D(\tilde{T}_a(x), T_b(y))$, $D(T_a(x), \tilde{T}_b(y))$ using the formulae (7), (9), (11), and (13), respectively. On the contrary, when the vertex x is the root of the tree $T_a$, the distance calculation section 7 calculates the distances between subtrees in the RO trees $D(T_a(x), T_b(y))$ and $D(T_a(x), \tilde{T}_b(y))$, using the formulae (7) and (13), respectively. After the distance calculation section 7 calculates each distance, the process proceeds to S11.

In the S10, first it is judged as to whether or not the vertexes x and y are the roots of the trees $T_a$ and $T_b$, respectively. Then, when both the vertexes x and y are not the roots of the trees $T_a$ and $T_b$, the distance calculation section 7 calculates the distances between subtrees in the RO trees $D(T_a(x), T_b(y))$, $D(\tilde{T}_a(x), \tilde{T}_b(y))$, $D(\tilde{T}_a(x), T_b(y))$, $D(T_a(x), \tilde{T}_b(y))$ using the formulae (1) to (4), respectively. When the vertex x is the root of the tree $T_a$ and the vertex y is not the root of the tree $T_b$, the distance calculation section 7 calculates the distances between subtrees in the RO trees $D(T_a(x), T_b(y))$ and $D(T_a(x), \tilde{T}_b(y))$, using the formulae (1) and (4), respectively. When the vertex x is not the root of the tree $T_a$ and the vertex y is the root of the tree $T_b$, the distance calculation section 7 calculates the distances between subtrees in the RO trees $D(T_a(x), T_b(y))$ and $D(\tilde{T}_a(x), T_b(y))$, using the formulae (1) and (3), respectively. After the distance calculation section 7 calculates each distance, the process proceeds to S11.

Next, the distance calculation section 7 determines whether or not y=1, that is, whether or not the vertex y is the root of the tree $T_b$ (S11). When y≠1 (No at S11), y is decremented by one (S12) Then, the process returns to S05. When y=1 (Yes at S11), the distance calculation section 7 determines whether or not x=1, that is, whether or not the vertex x is the root of the tree $T_a$ (S13). When x≠1 (No at S13), x is decremented by one (S14). Then, the process returns to S04. When x=1 (Yes at S13), this means that distances between all subtrees including the trees $T_a$ and $T_b$ are calculated. In other words, the distance $D(T_a(1) T_b(1))$ has already been obtained. Therefore, the distance calculation section 7 outputs the distance $D(T_a(1), T_b(1))$ to the semantic content comparison section 8 through the memory 18. The semantic content comparison section 8 obtains a distance between the text sentences $S_1$ and $S_2$ on the basis of the input distance $D(T_a(1), T_b(1))$ and the formulae 16 and 17 (S15).

[Calculation Procedure of the Distance Between R Trees]

Figure 13:
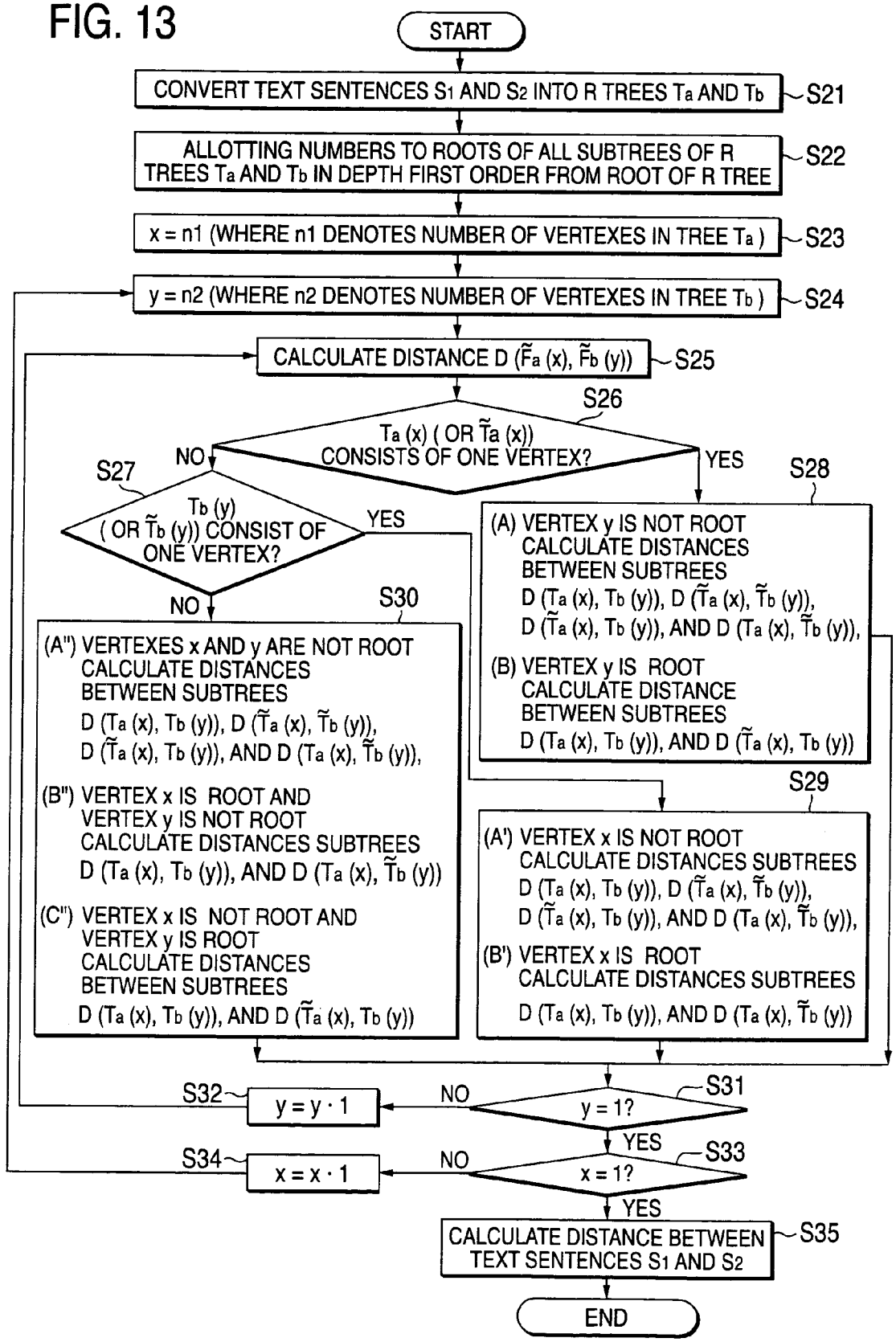
FIG. 13 shows calculation procedure of the distance between R trees

Next, a procedure for converting text sentences $S_1$ and $S_2$ into R trees to obtain a distance between the text sentences $S_1$ and $S_2$ will be described with reference to a flow chart shown in FIG. 13.

The input two text sentences $S_1$ and $S_2$ are converted into R trees $T_a$ and $T_b$ by using the morphological analysis section 2, the semantic analysis section 3, and the tree structure conversion section 4 (S21). As shown in FIG. 4, the word information are allotted to vertexes of the trees $T_a$ and $T_b$ and the case information are allotted to edges of trees $T_a$ and $T_b$. Numbers from 1 to n are allotted to vertexes and edges of trees $T_a$ and $T_b$ (n denotes a positive integer). The numbers are allotted in the depth first order from the root of the R tree (S22).

Next, x is set n1 and y is set n2 (n1 and n2 are number of the vertexes of the tree $T_a$ and number of the vertexes of the tree $T_b$, respectively) (S23 and S24). The distance $D(\tilde{F}_a(x), \tilde{F}_b(y))$ between an unordered forest $\tilde{F}_a(x)$ and an unordered forest $\tilde{F}_b(y)$ are calculated using the formula 14 (S25). Incidentally, when distances between trees, between subtrees, and between forests are calculated, the distance calculation section 7 obtains the vertex substitution weight $\delta(x, y)$, the vertex deletion weight $q(y)$, the vertex insertion weight $r(x)$, the edge substitution weight $\delta(\tilde{x}, \tilde{y})$, the edge deletion weight $q(\tilde{y})$, and the edge insertion weight $r(\tilde{x})$ from the word-mapping-weight calculation section 5 and the case-mapping-weight calculation section 6 to calculate the distance.

Subsequently, it is judged as to whether or not a subtree $T_a(x)$ (or $\tilde{T}_a(x)$) is a subtree consisting of one vertex (S26). If yes, the process proceeds to S28. On the contrary, if no, the process proceeds to S27.

In the S27, it is judged as to whether or not a subtree $T_b(y)$ (or $\tilde{T}_b(y)$) is a subtree consisting of one vertex. If yes, the process proceeds to S29. On the contrary, if no, the process proceeds to S30.

In the S28, first it is judged as to whether or not the vertex y is the root of the tree $T_b$. Then, when the vertex y is not the root of the tree $T_b$, the distance calculation section 7 calculates the distances between subtrees in the R trees $D(T_a(x), T_b(y))$, $D(\tilde{T}_a(x), \tilde{T}_b(y))$, $D(\tilde{T}_a(x), T_b(y))$, $D(T_a(x), \tilde{T}_b(y))$ using the formulae (6), (8), (10), and (12), respectively. On the contrary, when the vertex y is the root of the tree $T_b$, the distance calculation section 7 calculates the distances between subtrees in the R trees $D(T_a(x), T_b(y))$ and $D(\tilde{T}a(x), T_b(y))$, using the formulae (6) and (10), respectively. After the distance calculation section 7 calculates each distance, the process proceeds to S31.

In the S29, first it is judged as to whether or not the vertex x is the root of the tree $T_a$. Then, when the vertex x is not the root of the tree $T_a$, the distance calculation section 7 calculates the distances between subtrees in the R trees $D(T_a(x), T_b(y))$, $D(\tilde{T}_a(x), \tilde{T}_b(y))$, $D(\tilde{T}_a(x), T_b(y))$, $D(T_a(x), \tilde{T}_b(y))$ using the formulae (7), (9), (11), and (13), respectively. On the contrary, when the vertex x is the root of the tree $T_a$, the distance calculation section 7 calculates the distances between subtrees in the R trees $D(T_a(x), T_b(y))$ and $D(T_a(x), \tilde{T}_b(y))$, using the formulae (7) and (13), respectively. After the distance calculation section 7 calculates each distance, the process proceeds to S31.

In the S30, first it is judged as to whether or not the vertexes x and y are the roots of the trees $T_a$ and $T_b$, respectively. Then, when both the vertexes x and y are not the roots of the trees $T_a$ and $T_b$, the distance calculation section 7 calculates the distances between subtrees in the R trees $D(T_a(x), T_b(y))$, $D(\tilde{T}_a(x), \tilde{T}_b(y))$, $D(\tilde{T}_a(x), T_b(y))$, $D(T_a(x), \tilde{T}_b(y))$ using the formulae (1) to (4), respectively. When the vertex x is the root of the tree $T_a$ and the vertex y is not the root of the tree $T_b$, the distance calculation section 7 calculates the distances between subtrees in the R trees $D(T_a(x), T_b(y))$ and $D(T_a(x), \tilde{T}_b(y))$, using the formulae (1) and (4), respectively. When the vertex x is not the root of the tree $T_a$ and the vertex y is the root of the tree $T_b$, the distance calculation section 7 calculates the distances between subtrees in the R trees $D(T_a(x), T_b(y))$ and $D(\tilde{T}_a(x), T_b(y))$, using the formulae (1) and (3), respectively. After the distance calculation section 7 calculates each distance, the process proceeds to S31.

Next, the distance calculation section 7 determines whether or not y=1, that is, whether or not the vertex y is the root of the tree $T_b$ (S31). When y≠1 (No at S31), y is decremented by one (S32). Then, the process returns to S25. When y=1 (Yes at S11), the distance calculation section 7 determines whether or not x=1, that is, whether or not the vertex x is the root of the tree $T_a$ (S33) When x≠1 (No at S33), x is decremented by one (S34). Then, the process returns to S24. When x=1 (Yes at S33), this means that distances between all trees including the trees $T_a$ and $T_b$ are calculated. In other words, the distance $D(T_a(1), T_b(1))$ has already been obtained. Therefore, the distance calculation section 7 outputs the distance $D(T_a(1), T_b(1))$ to the semantic content comparison section 8 through the memory 18. The semantic content comparison section 8 obtains a distance between the text sentences $S_1$ and $S_2$ on the basis of the input distance $D(T_a(1), T_b(1))$ and the formulae 16 and 17 (S35).

The distance $D(T_a, T_b) = D(T_a(x=1), T_b(y=1))$ between either the RO trees or the R trees can be obtained by using the above-explained methods.

Next, the semantic content comparison section 9 obtains a distance between text sentences by using formula 16 or formula 17.

A symbol "$D(S_1, S_2)$" indicates a distance between a sentence "$S_1$" and a sentence "$S_2$", symbol "$T_1$" represents a tree structure (either RO tree or R tree) of the sentence "$S_1$", and symbol "$T_2$" shows a tree structure (either RO tree or R tree) of the sentence "$S_2$", and symbol "$D(T_1, T_2)$" indicates a distance between the tree $T_1$ and the tree $T_2$.

$$D(S_1, S_2) = D(T_1, T_2) \qquad (16)$$

$$D(S_1, S_2) = \frac{D(T_1, T_2)}{|T_1| + |T_2|} \qquad (17)$$

EXAMPLE

Next, a description will be given on an operation of the apparatus and the method for comparing the semantic contents of the text sentences according to the embodiment of the present invention, using a specific example.

A process and a result of obtaining the similarity (or the difference) between a sentence A "my wife, Hanako, has a cold" and a sentence B "my wife has a cold" will be give, using the apparatus for comparing the semantic contents of the text sentences according to the embodiment of the invention. In this example, the word deletion weight, the word insertion weight, the case deletion weight, and the case insertion weight are set to 70. The word substitution weight is set to 100, and also, the case substitution weight is set to 100.

Figure 9A:
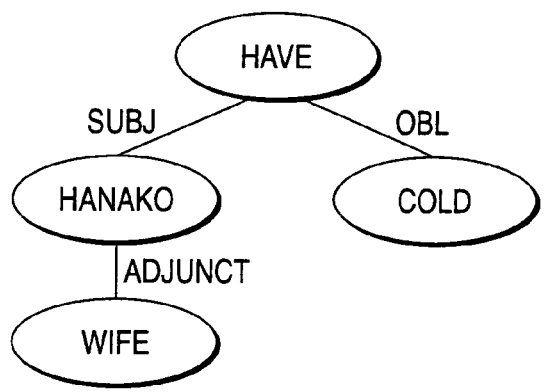
FIG. 9 is a diagram for representing tree structures of a Japanese sentence "A" and another Japanese sentence "B".
Figure 9B:
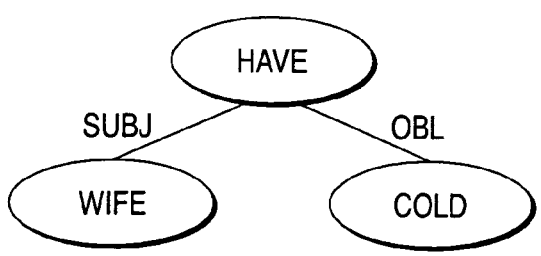

First, both the sentence A and the sentence B are orphologically analyzed. Then, the syntax and semantic analysis are performed with respect to the sentences A and B. As a result, these two sentences A and B are converted into, for instance, an RO tree $T_A$ and an RO tree $T_B$ shown in FIG. 9A and FIG. 9B, respectively.

Next, the distance between the two converted RO trees is calculated using the formula 1. Finally, the distance between the two text sentences A and B is calculated using either the formula 16 or the formula 17.

When the formula 16 is used, the distance between the text sentence A and the text sentence B becomes $D(A, B) = 140$. When the formula 17 is used, the distance between the text sentence A and the text sentence B becomes $D(A, B) = 20 (= 140/7)$. In this case, the distance between the two RO trees $T_A$ and $T_B$ is $D(T_A, T_B) = 140$, and total number of vertexes of the two RO trees $T_A$ and $T_B$ is equal to 7.

Figure 10:
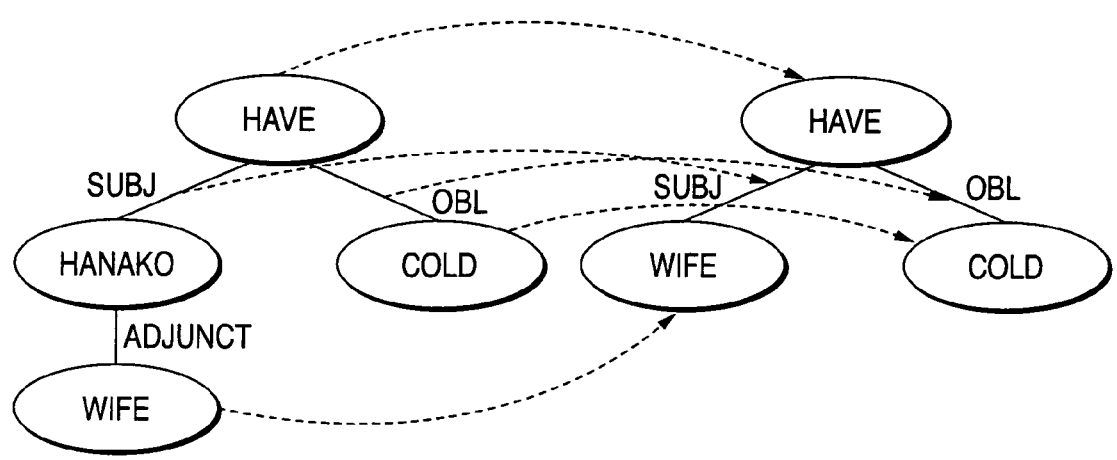
FIG. 10 is a diagram for showing an example of mapping operation for applying distances between RO trees of the Japanese sentence A and the Japanese sentence B.

FIG. 10 shows one mapping between RO trees for giving the distance $D(T_A, T_B)$. As shown in this drawing, a distance between the two RO trees $T_A$ and $T_B$ becomes equal to a sum of a deletion weight of 70, which is required for deleting the word "Hanako" and a deletion weight of 70, which is required for deleting the case "ADJUNCT".

Accordingly, in the text sentence comparing apparatus and the text sentence comparing method according to the invention, text sentences are morphologically analyzed and semantically analyzed. Then, the sentence structure and meaning of the entire analyzed text sentences converted into either RO trees or R trees on the graph theory. That is, the sentence structure and meaning of the entire text sentences are converted into either the RO trees or the R trees. The word information (including the attributes of the words) and the dependency relation information (case information) between words appearing in the text sentences are stored in vertexes and edges of either the RO trees or the R trees, respectively. A distance between either the RO trees or the R trees, which is based on a correspondence relationship between the vertexes and edges, is applied to a distance measuring differences in semantic contents between the text sentences. The differences in semantic contents between the text sentences are compared by using the distance between either the RO trees or the R trees. Thereby, the semantic contents between the input two text sentences can be obtained with high precision and in a real time.

Specifically, in the invention, the distance between the text sentences is defined based on the difference in the word information between the text sentences, the difference in the case information, and the difference in the entire constructions between the text sentences. Therefore, the distance functions according to the invention have the following three good natures. That is, (1) a distance between two text sentences, whose meanings are similar to each other and whose constructions are similar to each other is obtained as a small value; (2) a distance between two text sentences whose meanings are different from each other and whose constructions are not similar to each other is obtained as a very large value; and (3) a distance between two text sentences whose meanings are different from each other, but whose constructions are similar to each other is obtained based upon either a difference in word information or both the difference in word information and a difference in case information. As a result, the distance between the two text sentences can be calculated in high precision.

Also, in this example, as to the RO tree, the distance between the two text sentences can be calculated on the order of $n^2$ (namely, squared total number "n" of vertexes of an RO tree, i.e. "$O(n^2)$"). As to the R tree, the distance between the two text sentences can be calculated on the order of $n^2$ and "m" (namely, squared total number "n" of vertexes of R tree and maximum number "m" of children, i.e., "$O(mn^2)$") Accordingly, the distance between the two text sentences can be calculated in real time.

It should also be noted that as the arrangement of the text sentence comparing apparatus of the present invention, the present invention is not limited only to the above-explained arrangements, but may be realized by employing various other arrangements. Alternatively, the inventive idea of the present invention maybe provided in the form of, for example, a program capable of realizing the comparing method according to the present invention.

Also, as the application field of the present invention, the present invention is not limited only to the above-described application fields, but may be applied to other various technical fields.

Alternatively, as the various sorts of process operations executed in the present invention, such an arrangement may be employed in which, for example, a processor executes a control program stored in a ROM (Read-Only Memory) in a hardware resource equipped with the processor and a memory. Also, the respective function means for executing this process operation may be arranged as independent hardware circuits.

Alternatively, the present invention may be grasped as a computer readable recording medium and a relevant program itself, while the computer readable recording medium is realized as a CD (Compact Disc)-ROM and a floppy (registered trademark) disk which has previously stored thereinto the above-explained control program. Thus, since this control program is entered from the recording medium to the computer so as to be executed by the processor, the process operations according to the present invention may be executed.

As previously explained in detail, in accordance with the text sentence comparing apparatus and the text sentence comparing method related to the invention, the entire constructions and the meanings of the text sentences are expressed by either the RO trees or the R trees in the graphic theory, and the differences in the semantic content between the text sentences are compared with each other by using either the distances between the RO trees based on the correspondence relationships among the vertexes and the edges or the distances between the R trees based on the correspondence relationships among the vertexes and the edges. As a result, the semantic content between the two inputted text sentences can be grasped in high precision and in real time. In accordance with the invention, for instance, not only the semantic content of the documents can be compared with each other and the documents can be classified based on the semantic content, but also the information searching intention by the user can be understood. In other words, since the request of the user which is represented in the natural language is compared with the storage content of the database which has been constructed by way of the previous learning, the information searching intention of the user can be predicted.

In the embodiment of the invention, the description has been given on the English text sentences. It goes without saying that the invention can be applied to any natural languages such as Japanese, Chinese, French, and German.

What is claimed is:

1. A text sentence comparison method comprising:
   converting a first text sentence and a second text sentence into a first R tree and a second R tree, respectively;
   calculating a distance between the first R tree and the second R tree based on a distance between two R trees, which is defined at least in accordance with a condition of a mapping between vertexes and edges of the two R trees; and
   calculating a distance between the first text sentence and the second text sentence based on the distance between the first R tree and the second R tree, wherein
   word information contained in the first text sentence are allotted to the vertexes of the first R tree;
   word information contained in the second text sentence are allotted to the vertexes of the second R tree;
   case information contained in the first text sentence are allotted to edges of the first R tree; and
   case information contained in the second text sentence are allotted to edges of the second R tree.

2. The text sentence comparison method according to claim 1, calculating the distance between the first R tree and the second R tree comprising:
   calculating a mapping weight of a mapping from the first R tree to the second R tree;
   calculating a distance between a first forest, which the first R tree includes, and a second forest, which the second R tree includes; and
   calculating a distance between a first subtree, which the first R tree includes, and a second subtree, which the second R tree includes.

3. The text sentence comparison method according to claim 2, wherein
   the mapping weight is calculated based on a word substitution weight, a word deletion weight, a word insertion weight, a case substitution weight, a case deletion weight, and a case insertion weight.

4. The text sentence comparison method according to claim 1, further comprising:
   setting the condition of the mapping between the vertexes and edges of the two R trees.

5. The text sentence comparison method according to claim 1, wherein the condition of the mapping between the vertexes and edges of the two R trees includes:
   the mapping is a one-to-one mapping;
   the mapping preserves parent-child relationship;
   the mapping preserves structure; and
   the mapping between the vertexes does not intersect with the mapping between the edges.

6. The text sentence comparison method according to claim 1, further comprising:
   inputting the first text sentence and the second text sentence; and
   outputting the distance between the first text sentence and the second text sentence.

7. A text sentence comparison method comprising:
   converting a first text sentence and a second text sentence into a first RO tree and a second RO tree, respectively;
   calculating a distance between the first RO tree and the second RO tree based on a distance between two RO trees, which is defined at least in accordance with a condition of a mapping between vertexes and edges of the two RO trees; and
   calculating a distance between the first text sentence and the second text sentence based on the distance between the first RO tree and the second RO tree, wherein
   word information contained in the first text sentence are allotted to vertexes of the first RO tree;
   word information contained in the second text sentence are allotted to vertexes of the second RO tree;
   case information contained in the first text sentence are allotted to of the first RO tree; and
   case information contained in the second text sentence are allotted to edges of the second RO tree.

8. The text sentence comparison method according to claim 7, calculating the distance between the first RO tree and the second RO tree comprising:
   calculating a mapping weight of a mapping from the first RO tree to the second RO tree;
   calculating a distance between a first forest, which the first RO tree includes, and a second forest, which the second RO tree include; and
   calculating a distance between a first subtree, which the first RO tree includes, and a second subtree, which the second RO tree includes.

9. The text sentence comparison method according to claim 8, wherein
   the mapping weight is calculated based on a word substitution weight, a word deletion weight, a word insertion weight, a case substitution weight, a case deletion weight, and a case insertion weight.

10. The text sentence comparison method according to claim 7, further comprising:
    setting the condition of the mapping between the vertexes and edges of the two RO trees.

11. The text sentence comparison method according to claim 7, wherein the condition of the mapping between the vertexes and edges of the two RO trees includes:

the mapping is a one-to-one mapping;
the mapping preserves parent-child relationship;
the mapping preserves brother relationship;
the mapping preserves structure; and
the mapping between the vertexes does not intersect with the mapping between the edges.

12. The text sentence comparison method according to claim 7, further comprising:
inputting the first text sentence and the second text sentence; and
outputting the distance between the first text sentence and the second text sentence.

13. A text sentence comparison apparatus comprising:
an input section for inputting a first text sentence and a second text sentence;
a tree structure conversion section for converting the first text sentence and the second text sentence into a first R tree and a second R tree, respectively;
a distance calculation section for calculating a distance between the first R tree and the second R tree based on distance between two R trees, which is defined at least in accordance with a condition of a mapping between vertexes and edges of the two R trees; and
a semantic content comparison section for calculating a distance between the first text sentence and the second text sentence based on the distance between the first R tree and the second R tree, wherein
the tree structure conversion section allots:
word information contained in the first text sentence to the vertexes of the first R tree;
word information contained in the second text sentence to the vertexes of the second R tree;
case information contained in the first text sentence to the edges of the first R tree; and
case information contained in the second text sentence to the edges of the second R tree.

14. The text sentence comparison apparatus according to claim 13, wherein the distance calculation section calculates:
a mapping weight of a mapping from the first R tree to the second R tree,
a distance between a first forest, which the first R tree includes, and a second forest, which the second R tree includes, and
a distance between a first subtree, which the first R tree includes, and a second subtree, which the second R tree includes.

15. The text sentence comparison apparatus according to claim 14, wherein
the distance calculation section calculates the mapping weight based on a word substitution weight, a word deletion weight, a word insertion weight, a case substitution weight, a case deletion weight, and a case insertion weight.

16. The text sentence comparison apparatus according to claim 13, further comprising:
a setting input section for allowing a user to set the condition of the mapping between the vertexes and the edges of the two R trees.

17. The text sentence comparison apparatus according to claim 13, wherein the condition of the mapping between the vertexes and edges of the two R trees includes:
the mapping is a one-to-one mapping;
the mapping preserves parent-child relationship;
the mapping preserves structure; and
the mapping between the vertexes does not intersect with the mapping between the edges.

18. The text sentence comparison apparatus according to claim 13, further comprising:
an output section for outputting the distance between the first text sentence and the second text sentence.

19. A text sentence comparison apparatus comprising:
an input section for inputting a first text sentence and a second text sentence;
a tree structure conversion section for converting the first text sentence and the second text sentence into a first RO tree and a second RO tree, respectively;
a distance calculation section for calculating a distance between the first RO tree and the second RO tree based on distance between two RO trees, which is defined at least in accordance with a condition of a mapping between vertexes and edges of the two RO trees; and
a semantic content comparison section for calculating a distance between the first text sentence and the second text sentence based on the distance between the first RO tree and the second RO tree, wherein
the tree structure conversion section allots:
word information contained in the first text sentence to vertexes of the first RO tree;
word information contained in the second text sentence to vertexes of the second RO tree;
case information contained in the first text sentence to edges of the first RO tree; and
case information contained in the second text sentence to edges of the second RO tree.

20. The text sentence comparison apparatus according to claim 19, wherein the distance calculation section calculates:
a mapping weight of a mapping from the first RO tree to the second RO tree,
a distance between a first forest, which the first RO tree includes, and a second forest, which the second RO tree includes, and a distance between a first subtree, which the first RO tree includes, and a subtree, which the second RO tree includes.

21. The text sentence comparison apparatus according to claim 19, wherein:
the distance calculation section calculates the mapping weight based on a word substitution weight, a word deletion weight, a word insertion weight, a case substitution weight, a case deletion weight, and a case insertion weight.

22. The text sentence comparison apparatus according to claim 19, further comprising:
a setting input section for allowing a user to set the condition of the mapping between the first and second RO trees.

23. The text sentence comparison apparatus according to claim 19, wherein the condition of the mapping between the vertexes and edges of the two trees includes:
the mapping is a one-to-one mapping;
the mapping preserves parent-child relationship;
the mapping preserves brother relationship;
the mapping preserves structure; and
the mapping between the vertexes does not intersect with the mapping between the edges.

24. The text sentence comparison apparatus according to claim 19, further comprising:
an output section for outputting the distance between the first text sentence and the second text sentence.

25. The text sentence comparison method according to claim 1, wherein
the distance between the first text sentence and the second text sentence=(the distance between the first R tree and the second R tree)/(a sum of vertexes of the first R tree and vertexes of the second R tree).

26. The text sentence comparison method according to claim 7, wherein
the distance between the first text sentence and the second text sentence=(the distance between the first RO tree and the second RO tree)/(a sum of the first RO tree and vertexes of the second RO tree).

27. The text sentence comparison apparatus according to claim 13, wherein
the distance between the first text sentence and the second text sentence=(the distance between the first R tree and the second R tree)/(a sum of vertexes of the first R tree and vertexes of the second R tree).

28. The text sentence comparison apparatus according to claim 19, wherein
the distance between the first text sentence and the second text sentence=(the distance between the first RO tree and the second RO tree)/(a sum of vertexes of the first RO tree and vertexes of the second RO tree).

* * * * *